(12) United States Patent
Yamasaki

(10) Patent No.: US 8,928,794 B2
(45) Date of Patent: Jan. 6, 2015

(54) ZOOM LENS AND IMAGE PICKUP APPARATUS EQUIPPED WITH THE SAME

(71) Applicant: Canon Kabushiki Kaisha, Tokyo (JP)

(72) Inventor: Shinji Yamasaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 13/903,336

(22) Filed: May 28, 2013

(65) Prior Publication Data

US 2013/0321682 A1 Dec. 5, 2013

(30) Foreign Application Priority Data

May 30, 2012 (JP) .................. 2012-123560

(51) Int. Cl.
| | |
|---|---|
| *G02B 13/16* | (2006.01) |
| *H04N 5/225* | (2006.01) |
| *H04N 5/262* | (2006.01) |
| *G02B 15/14* | (2006.01) |
| *G02B 15/177* | (2006.01) |

(52) U.S. Cl.
CPC .............. *G02B 15/14* (2013.01); *G02B 15/177* (2013.01)
USPC ......... 348/335; 348/340; 348/376; 348/240.3

(58) Field of Classification Search
None
See application file for complete search history.

(56) References Cited

U.S. PATENT DOCUMENTS

| | | | |
|---|---|---|---|
| 6,038,084 A | 3/2000 | Okada et al. | |
| 2006/0072211 A1* | 4/2006 | Imamura | 359/686 |
| 2012/0013992 A1* | 1/2012 | Yamasaki et al. | 359/684 |
| 2012/0026601 A1 | 2/2012 | Matsumura | |

FOREIGN PATENT DOCUMENTS

| | | |
|---|---|---|
| JP | H01-216310 A | 8/1989 |
| JP | H11-119101 A | 4/1999 |
| JP | 2012-048200 A | 3/2012 |

* cited by examiner

*Primary Examiner* — Aung S Moe
*Assistant Examiner* — Euel Cowan
(74) *Attorney, Agent, or Firm* — Canon USA Inc IP Division

(57) ABSTRACT

A zoom lens includes, in order from an object side to an image side, a first lens unit having negative refractive power, a second lens unit having positive refractive power, a third lens unit having negative refractive power, and a fourth lens unit having positive refractive power, in which each lens unit moves during zooming from a wide-angle end to a telephoto end, and a focal length of the first lens unit, a focal length of the second lens unit, and a focal length of the entire zoom lens at the wide-angle end are appropriately set.

11 Claims, 21 Drawing Sheets

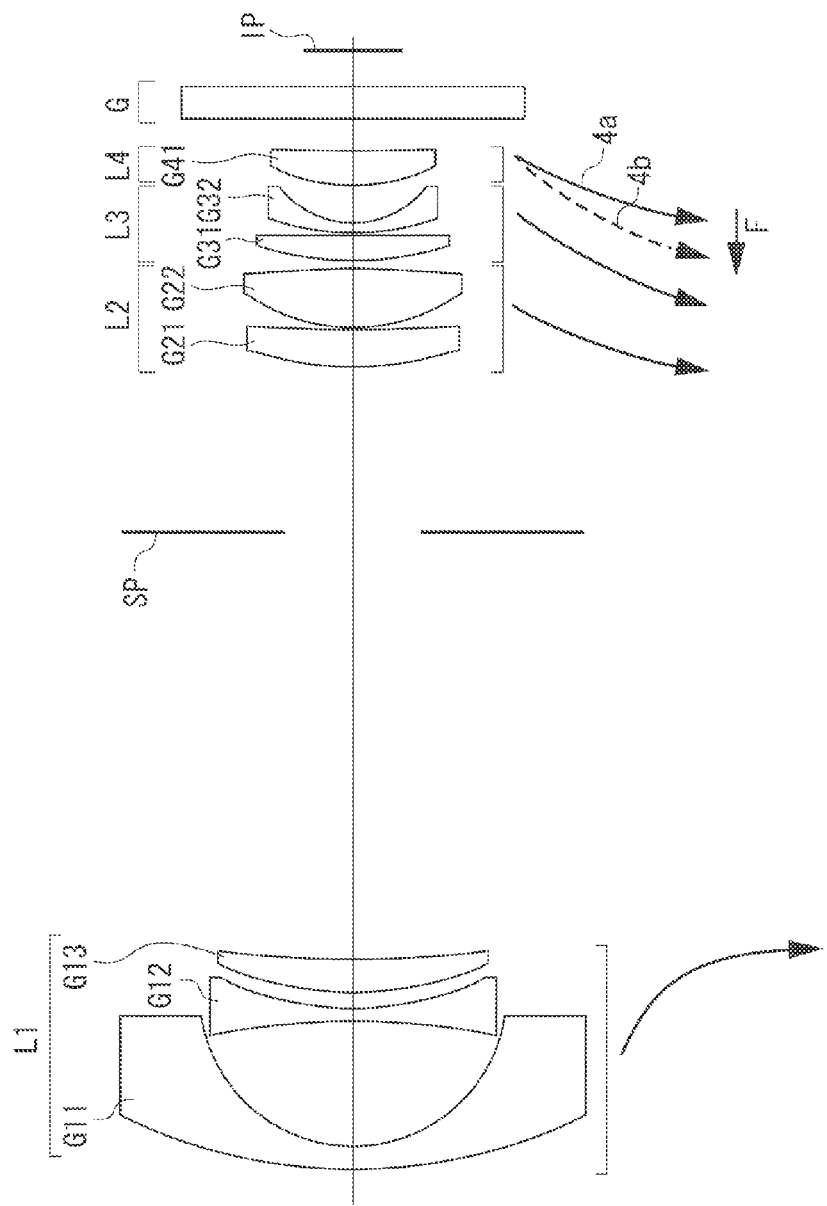

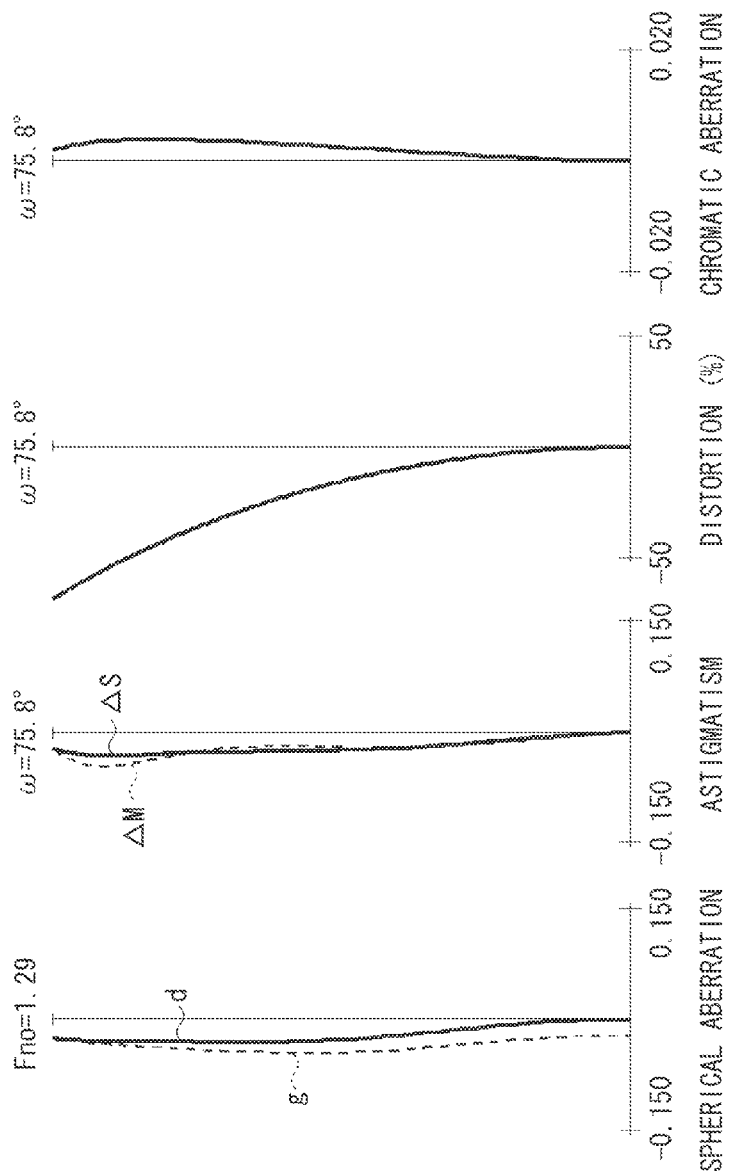

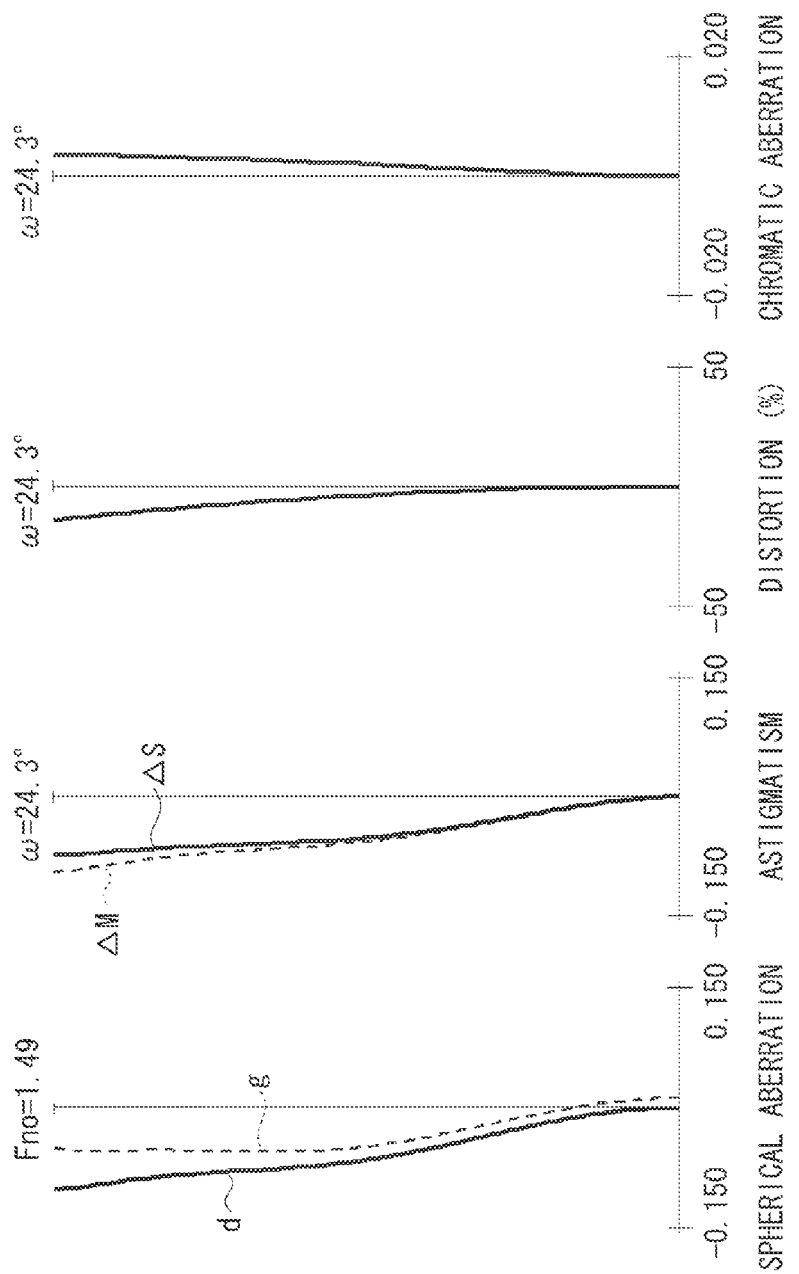

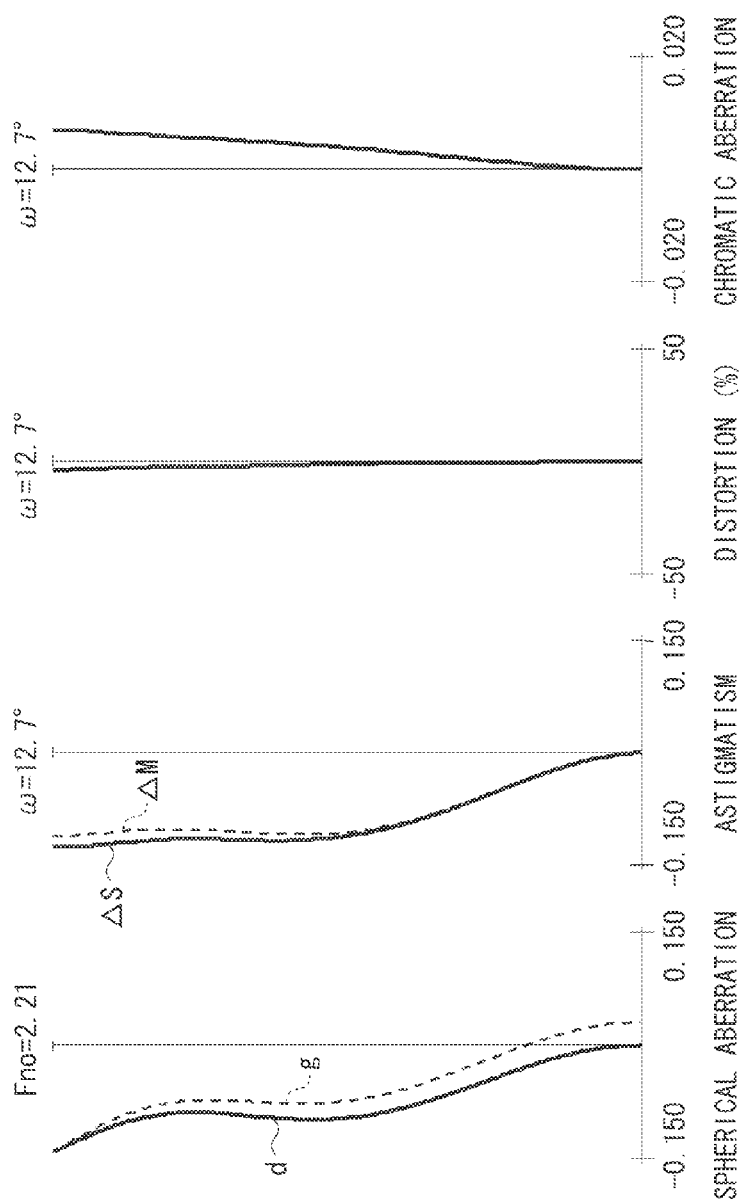

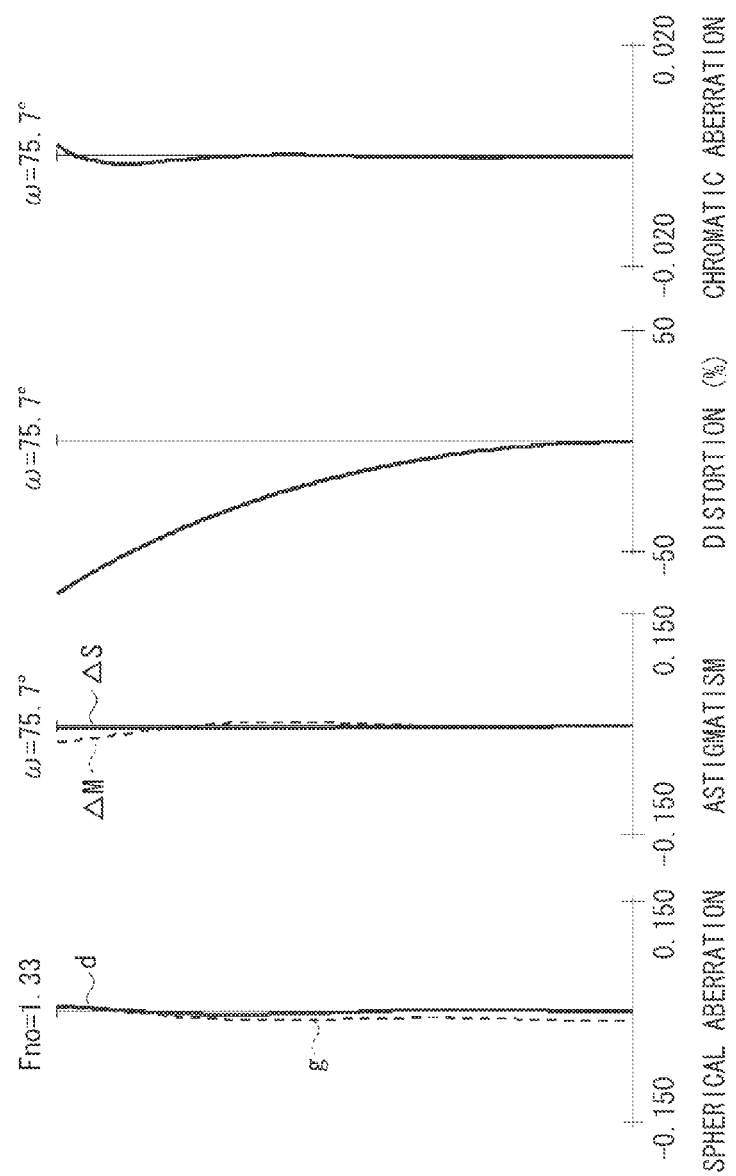

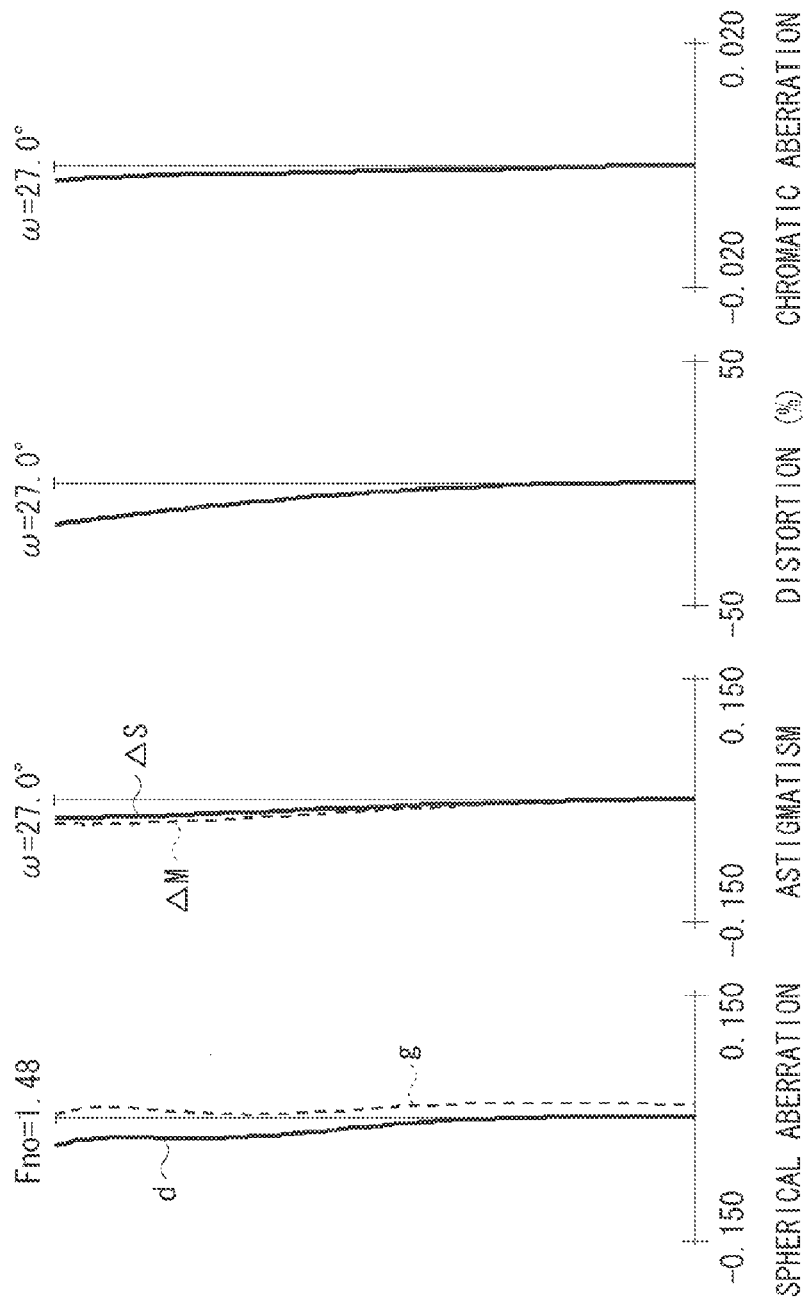

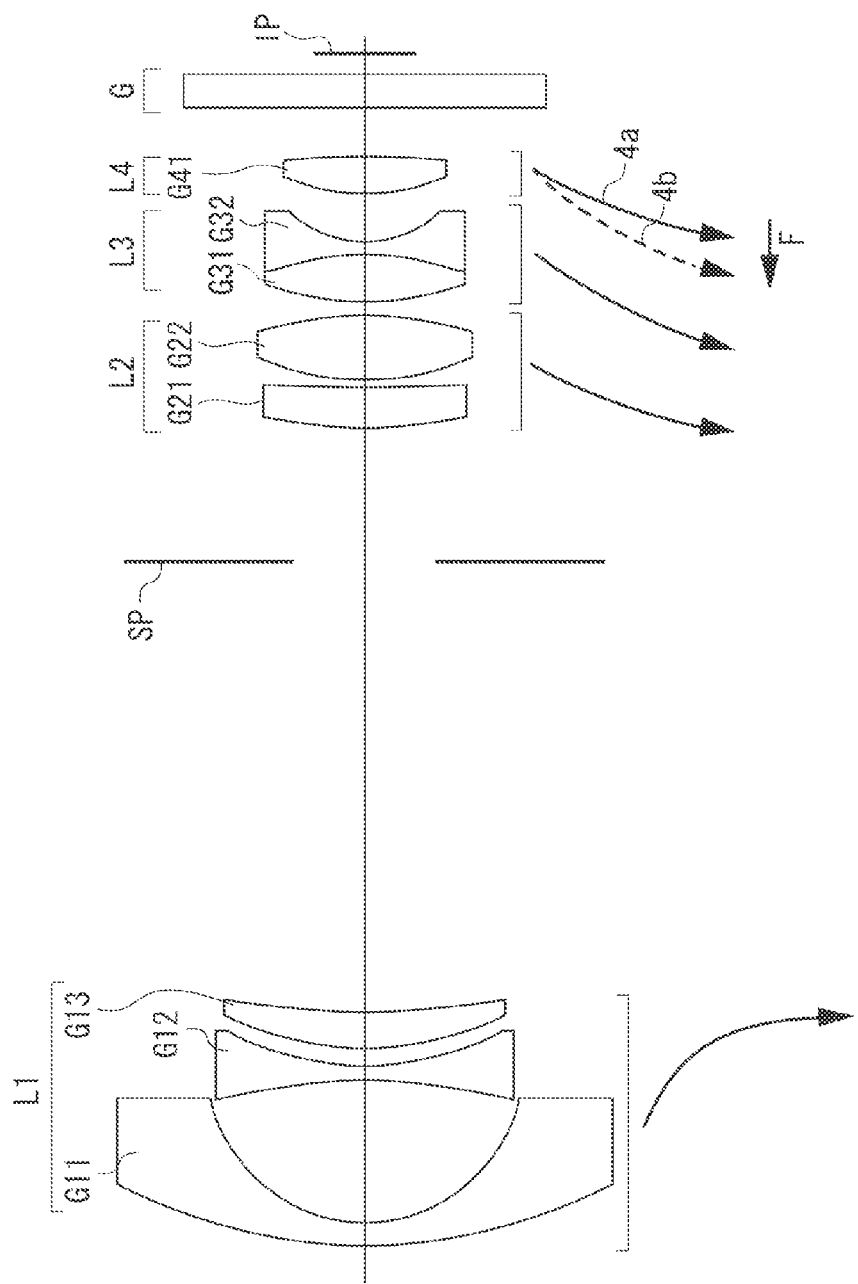

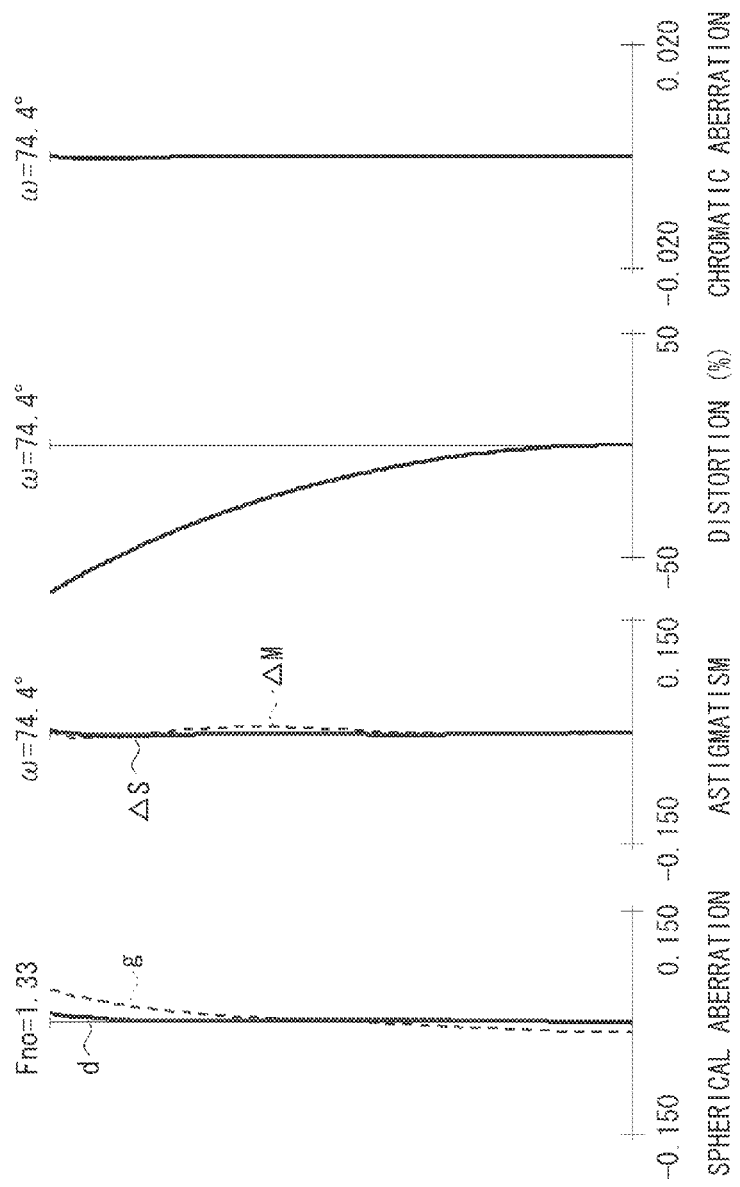

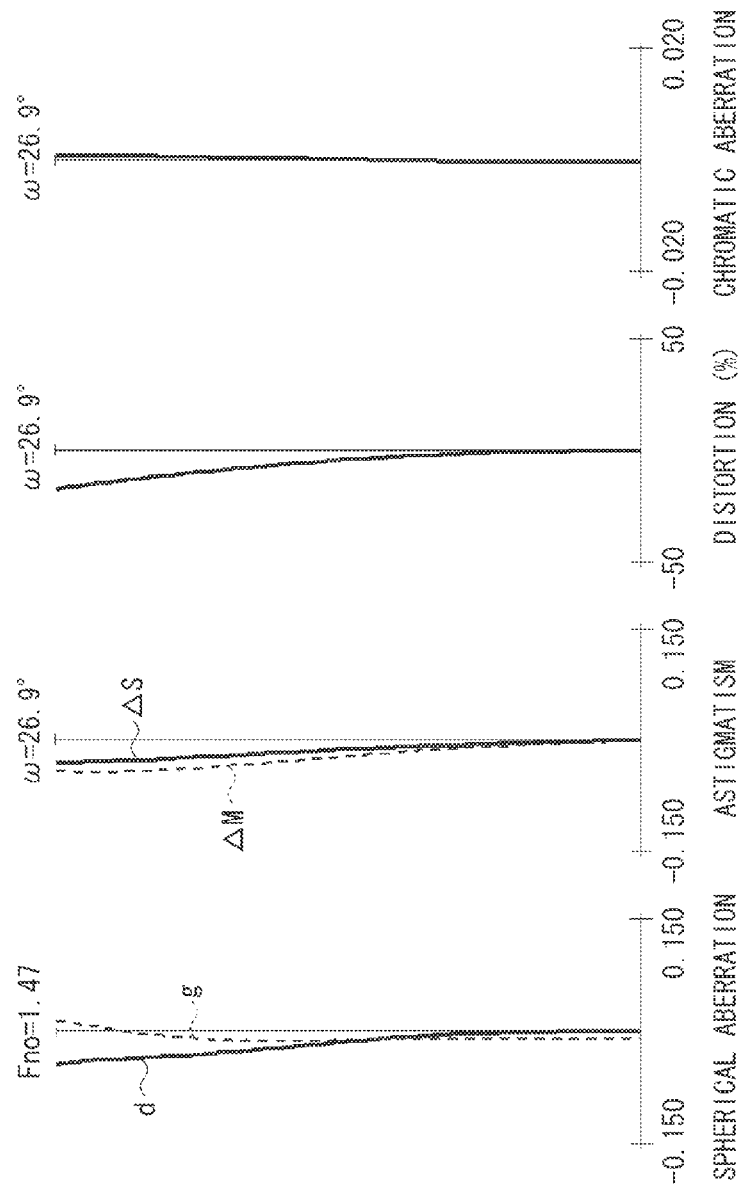

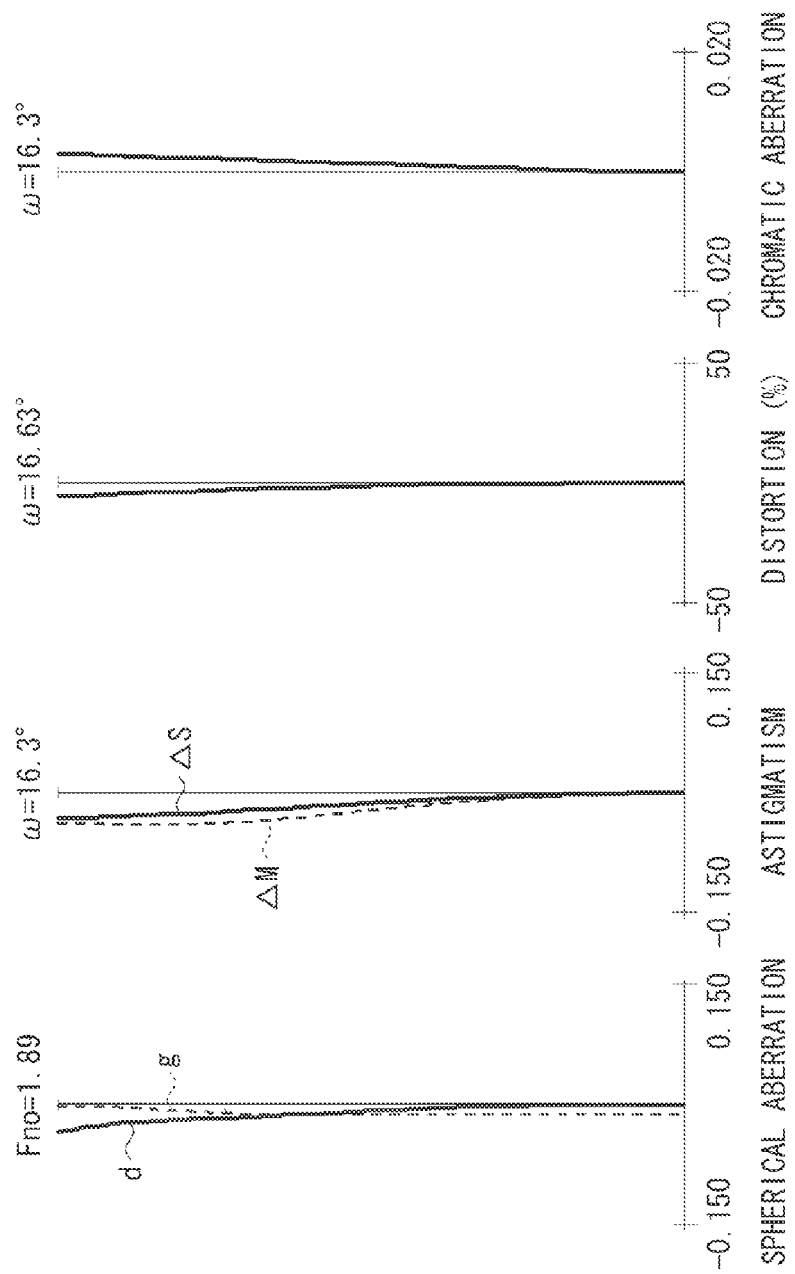

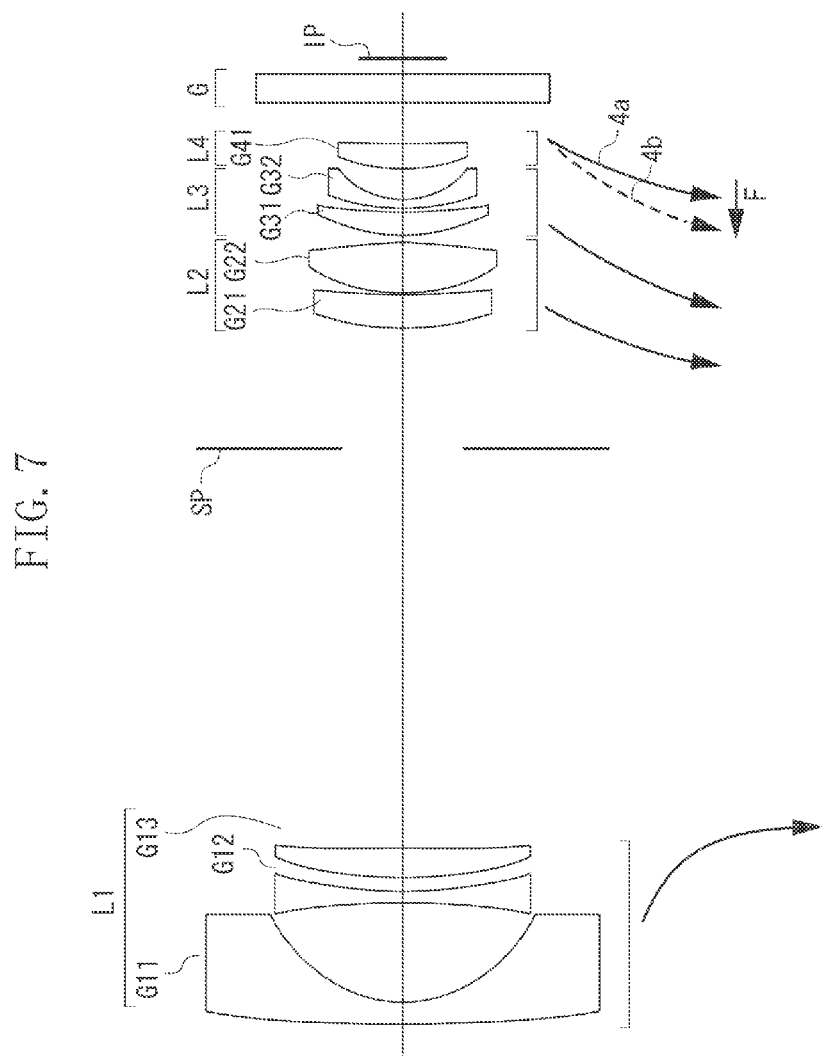

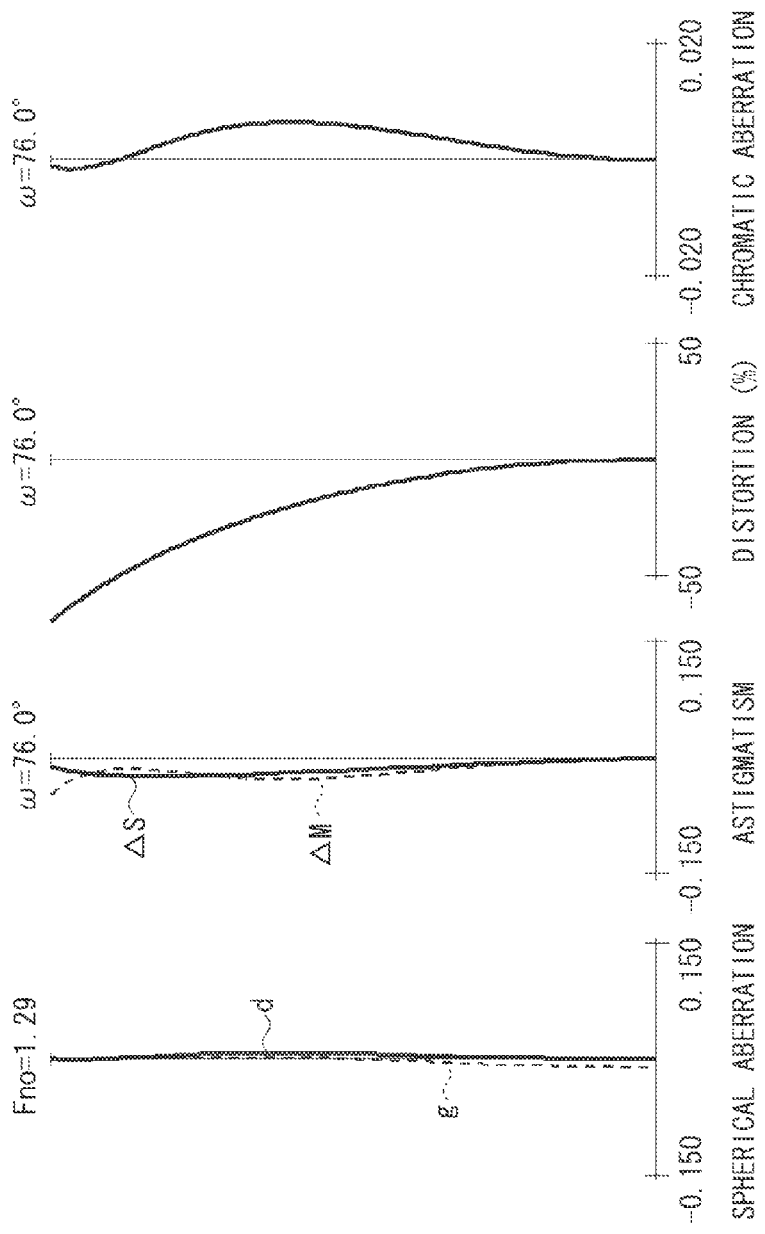

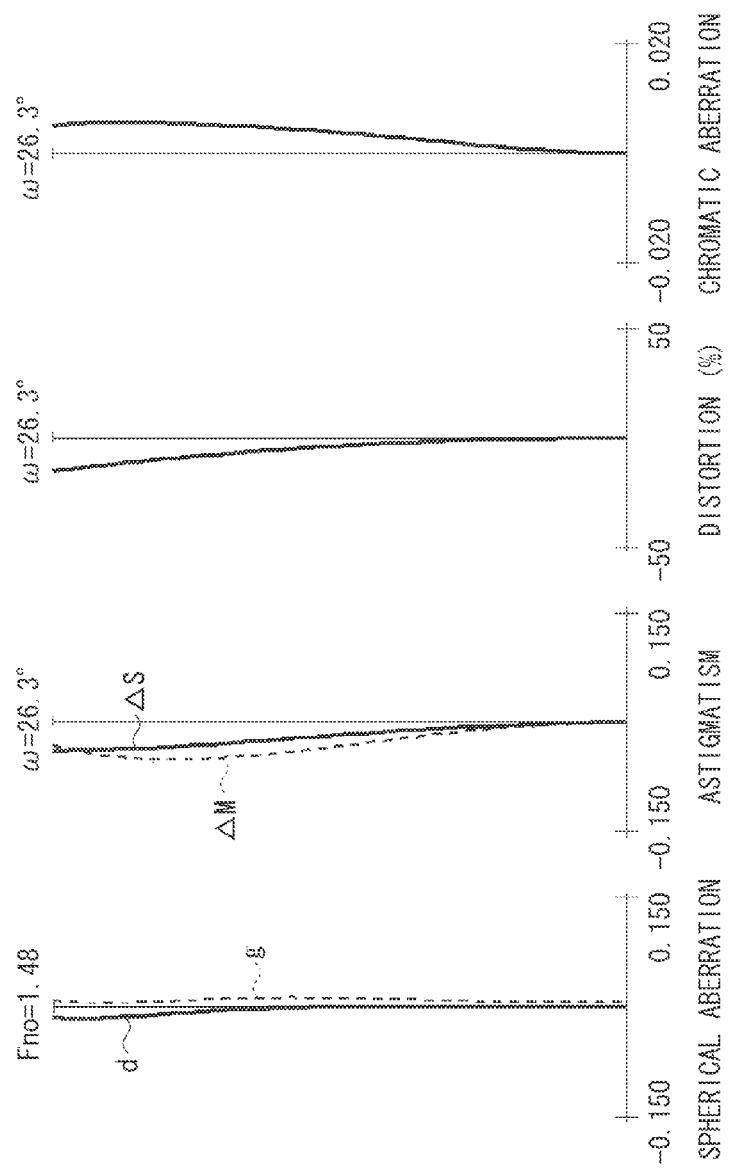

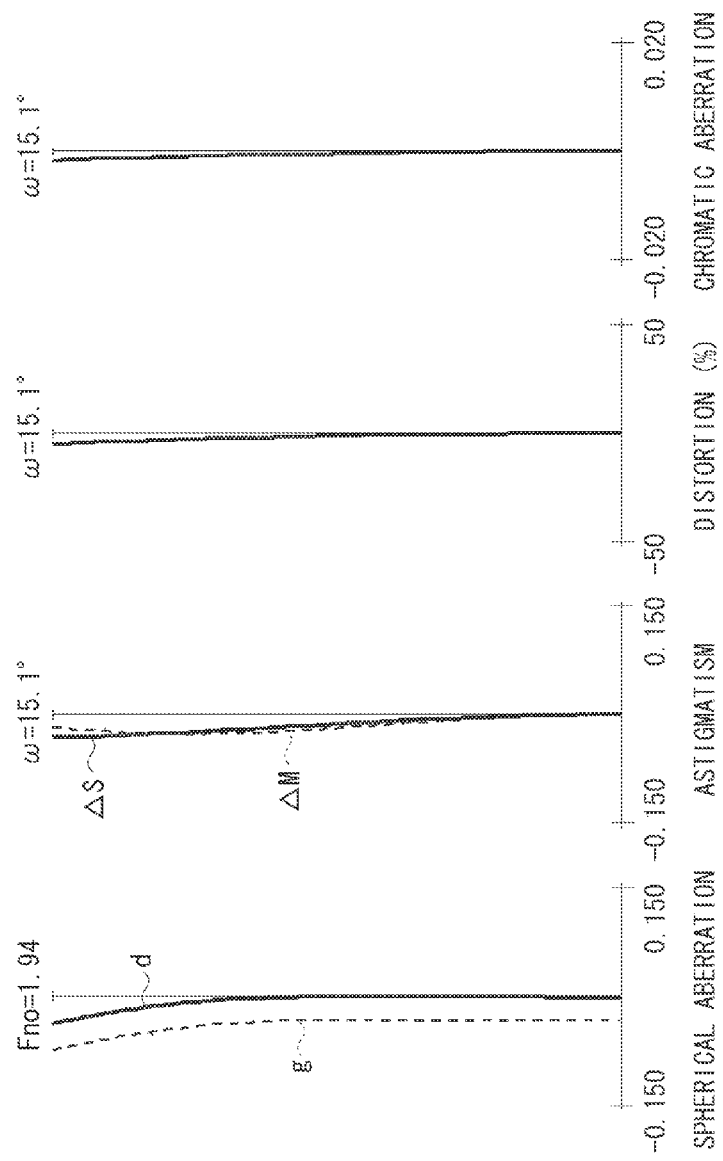

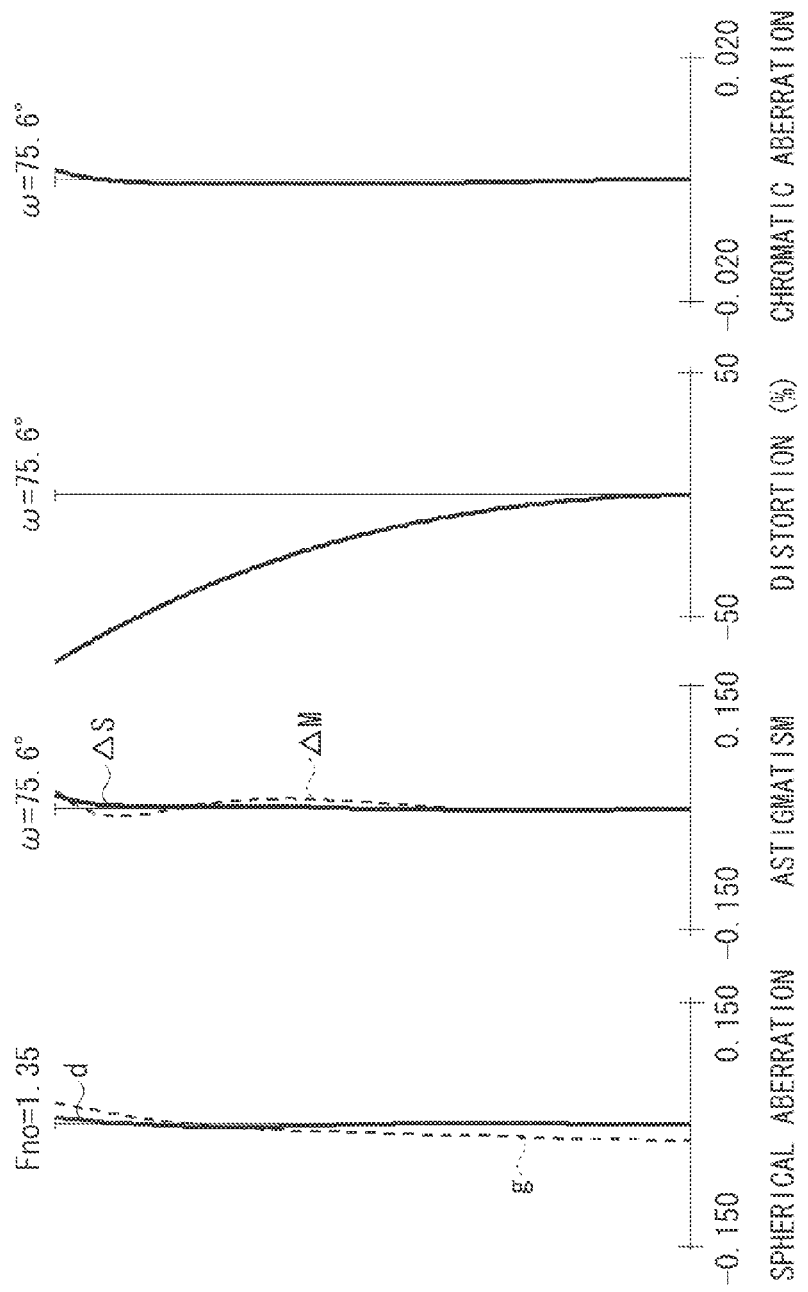

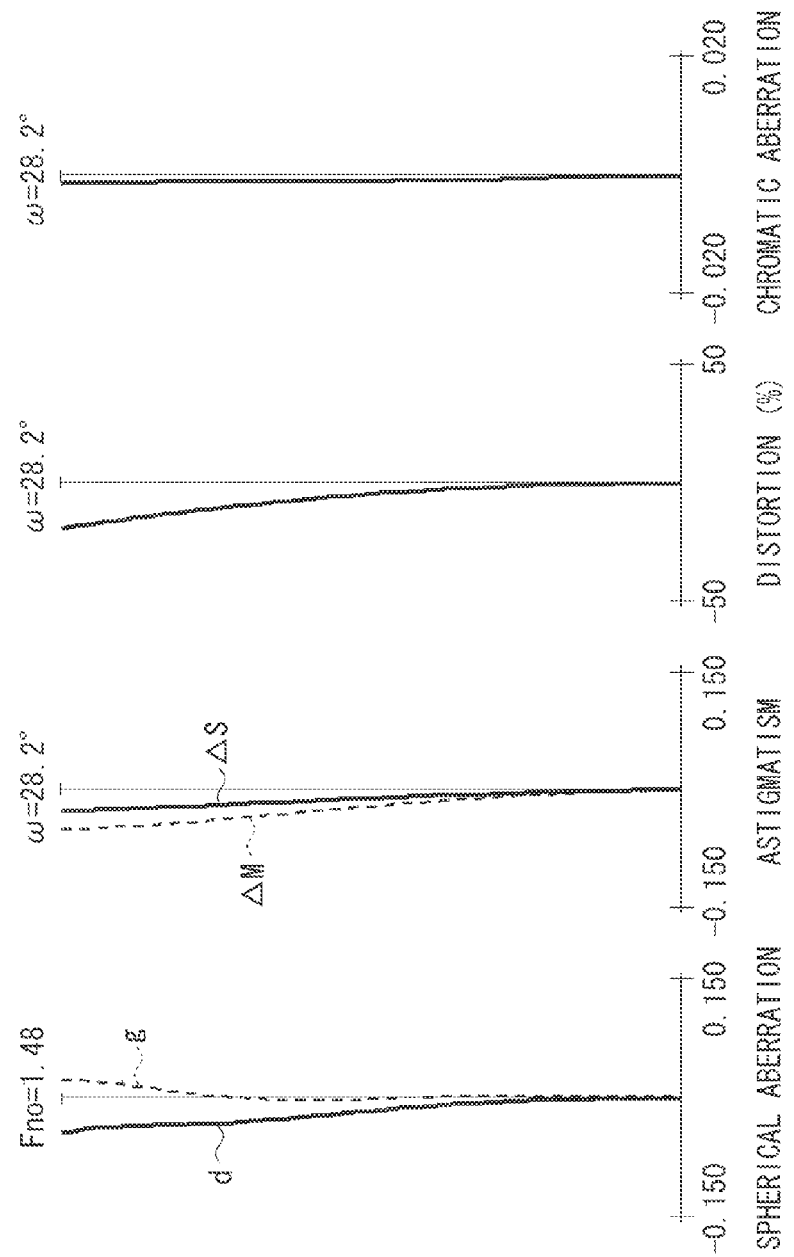

ZOOM LENS AND IMAGE PICKUP APPARATUS EQUIPPED WITH THE SAME

BACKGROUND OF THE INVENTION

1. Field of the Invention

The present disclosure relates to a zoom lens and an image pickup apparatus, such as a video camera, a monitoring camera, a digital still camera, or a broadcasting camera, equipped with the zoom lens.

2. Description of the Related Art

A photographic optical system used in an image pickup apparatus, such as a video camera, a monitoring camera, or a digital still camera, which uses a solid-state image sensor is required to have high optical performance and to be a small-sized zoom lens.

Further, a lens which is bright (has a small F-number (Fno)) at a wide angle of view is required to photograph a wide range and further, perform photographing even at night.

Japanese Patent Application Laid-Open No. 1-216310, Japanese Patent Application Laid-Open No. 11-119101, and Japanese Patent Application Laid-Open No. 2012-048200 discuss a three-unit zoom lens including, in order from an object side to an image side, a first lens unit having negative refractive power, a second lens unit having positive refractive power, and a third lens unit having positive refractive power or a four-unit zoom lens including, in order from an object side to an image side, a first lens unit having negative refractive power, a second lens unit having positive refractive power, a third lens unit having negative refractive power, and a fourth lens unit having positive refractive power.

In a negative-lead type three-unit zoom lens or four-unit zoom lens in which a lens unit located closest to the object side has negative refractive power, it is important to appropriately set a refractive power of each lens unit constituting the zoom lens or a lens configuration of each lens unit, and a movement amount during zooming, in order to acquire brightness (small Fno) at a wide angle of view and acquire high optical performance. In particular, it is important to appropriately set the refractive power of the first lens unit or the refractive power of the second lens unit and further, a balance between the refractive power of the first lens unit and the refractive power of the second lens unit.

SUMMARY OF THE INVENTION

An embodiment of the present invention is directed to a zoom lens which is bright at a wide angle of view and further, acquires high optical performance in the entire zoom range, and an image pickup apparatus equipped with the same.

According to an aspect of the present invention, a zoom lens includes, in order from an object side to an image side, a first lens unit having negative refractive power, a second lens unit having positive refractive power, a third lens unit having negative refractive power, and a fourth lens unit having positive refractive power, wherein each lens unit moves during zooming from a wide-angle end to a telephoto end, and wherein, when a focal length of the first lens unit is denoted by f1, a focal length of the second lens unit is denoted by f2, and a focal length of the entire zoom lens at the wide-angle end is denoted by fw, the following conditions are satisfied:

$-1.05 < f1/f2 < -0.55$ $-6.0 < f1/fw < -3.5.$

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a lens cross-sectional view at a wide-angle end of a zoom lens according to a first exemplary embodiment.

FIGS. 2A, 2B, and 2C are aberration diagrams at the wide-angle end, a middle zoom position, and a telephoto end, respectively, of the zoom lens according to the first exemplary embodiment.

FIGS. 4A, 4B, and 4C are aberration diagrams at the wide-angle end, a middle zoom position, and a telephoto end, respectively, of the zoom lens according to the second exemplary embodiment.

FIG. 5 is a lens cross-sectional view at a wide-angle end of a zoom lens according to a third exemplary embodiment.

FIGS. 6A, 6B, and 6C are aberration diagrams at the wide-angle end, a middle zoom position, and a telephoto end, respectively, of the zoom lens according to the third exemplary embodiment.

FIG. 7 is a lens cross-sectional view at a wide-angle end of a zoom lens according to a fourth exemplary embodiment.

FIGS. 8A, 8B, and 8C are aberration diagrams at the wide-angle end, a middle zoom position, and a telephoto end, respectively, of the zoom lens according to the fourth exemplary embodiment.

FIGS. 10A, 10B, and 10C are aberration diagrams at the wide-angle end, a middle zoom position, and a telephoto end, respectively, of the zoom lens according to the fifth exemplary embodiment.

DESCRIPTION OF THE EMBODIMENTS

Various exemplary embodiments, features, and aspects of the invention will be described in detail below with reference to the drawings.

Hereinafter, a zoom lens and an image pickup apparatus equipped with the same according to exemplary embodiments of the present invention will be described. The zoom lens according to the exemplary embodiment of the present invention includes, in order from an object side to an image side, a first lens unit having negative refractive power, a second lens unit having positive refractive power, a third lens unit having negative refractive power, and a fourth lens unit having positive refractive power. Each of the first to fourth lens units moves during zooming from a wide-angle end to a telephoto end.

More specifically, the first lens unit moves toward the image side, and the second, third, and fourth lens units all move toward the object side, during zooming from the wide-angle end (a short focal length end) to the telephoto end (a long focal length end).

Figure 3:
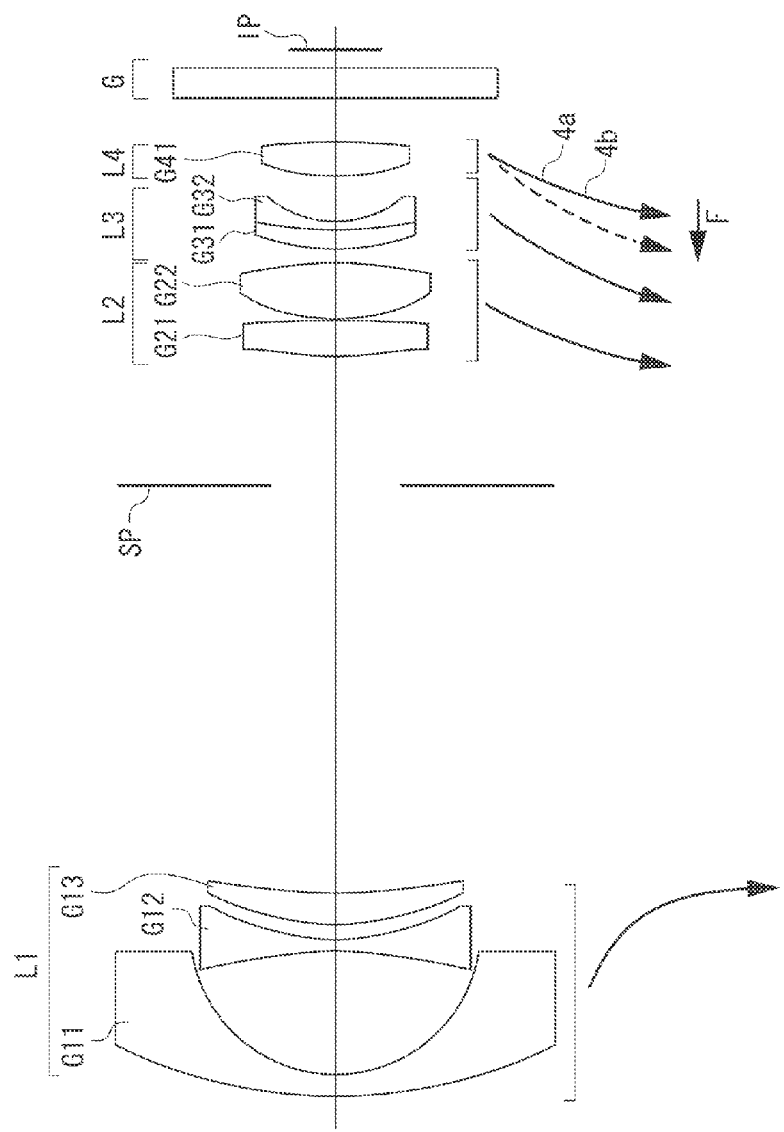
FIG. 3 is a lens cross-sectional view at a wide-angle end of a zoom lens according to a second exemplary embodiment.
Figure 4C:
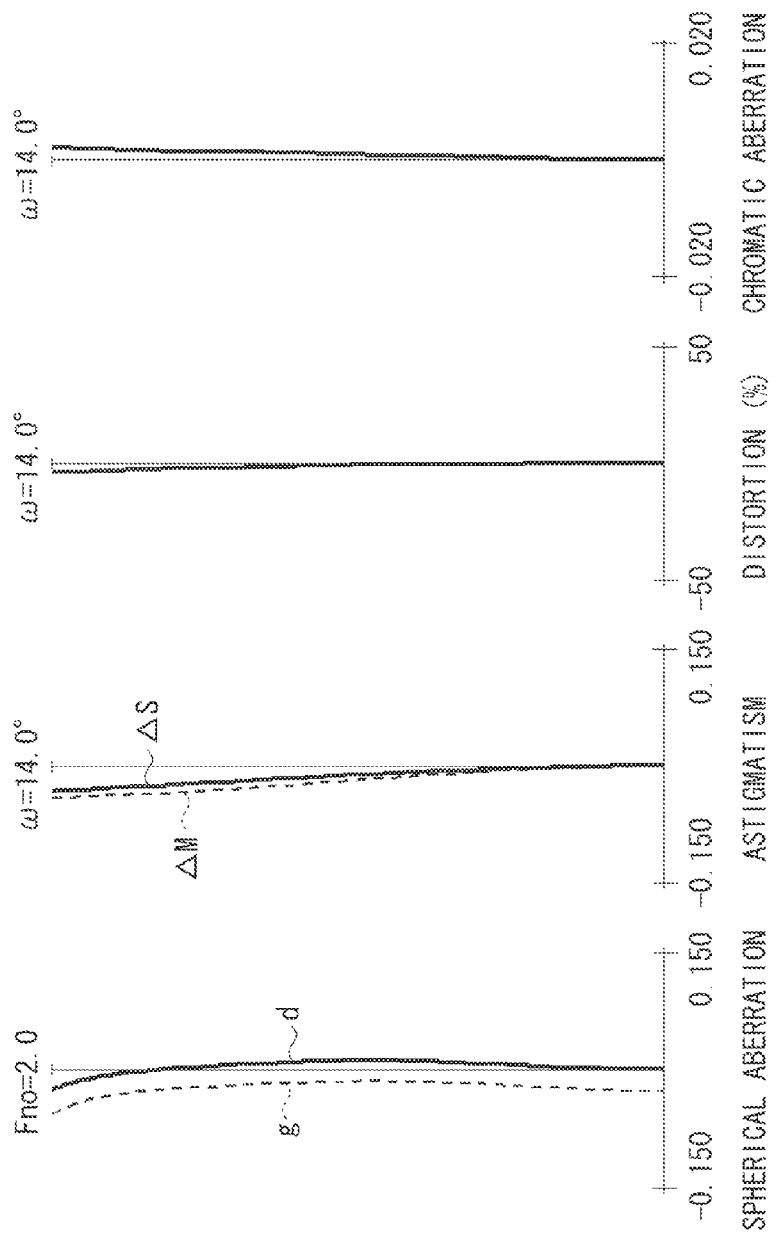

FIG. 1 is a lens cross-sectional view at a wide-angle end of a zoom lens according to a first exemplary embodiment. FIGS. 2A, 2B, and 2C are aberration diagrams at the wide-angle end, a middle zoom position, and a telephoto end, respectively, of the zoom lens according to the first exemplary embodiment. The first exemplary embodiment is a zoom lens in which a zoom ratio is 3.9 and an aperture ratio is approximately in the range of 1.29 to 2.21. FIG. 3 is a lens cross-sectional view at a wide-angle end of a zoom lens according to a second exemplary embodiment. FIGS. 4A, 4B, and 4C are aberration diagrams at the wide-angle end, a middle zoom position, and a telephoto end, respectively, of the zoom lens according to the second exemplary embodiment. The second exemplary embodiment is a zoom lens in which a zoom ratio is 3.4 and an aperture ratio is approximately in the range of 1.33 to 2.00.

FIG. 5 is a lens cross-sectional view at a wide-angle end of a zoom lens according to a third exemplary embodiment. FIGS. 6A, 6B, and 6C are aberration diagrams at the wide-angle end, a middle zoom position, and a telephoto end, respectively, of the zoom lens according to the third exemplary embodiment. The third exemplary embodiment is a zoom lens in which a zoom ratio is 3.0 and an aperture ratio is approximately in the range of 1.33 to 1.89. FIG. 7 is a lens cross-sectional view at a wide-angle end of a zoom lens according to a fourth exemplary embodiment. FIGS. 8A, 8B, and 8C are aberration diagrams at the wide-angle end, a middle zoom position, and a telephoto end, respectively, of the zoom lens according to the fourth exemplary embodiment. The fourth exemplary embodiment is a zoom lens in which a zoom ratio is 3.2 and an aperture ratio is approximately in the range of 1.29 to 1.94.

Figure 9:
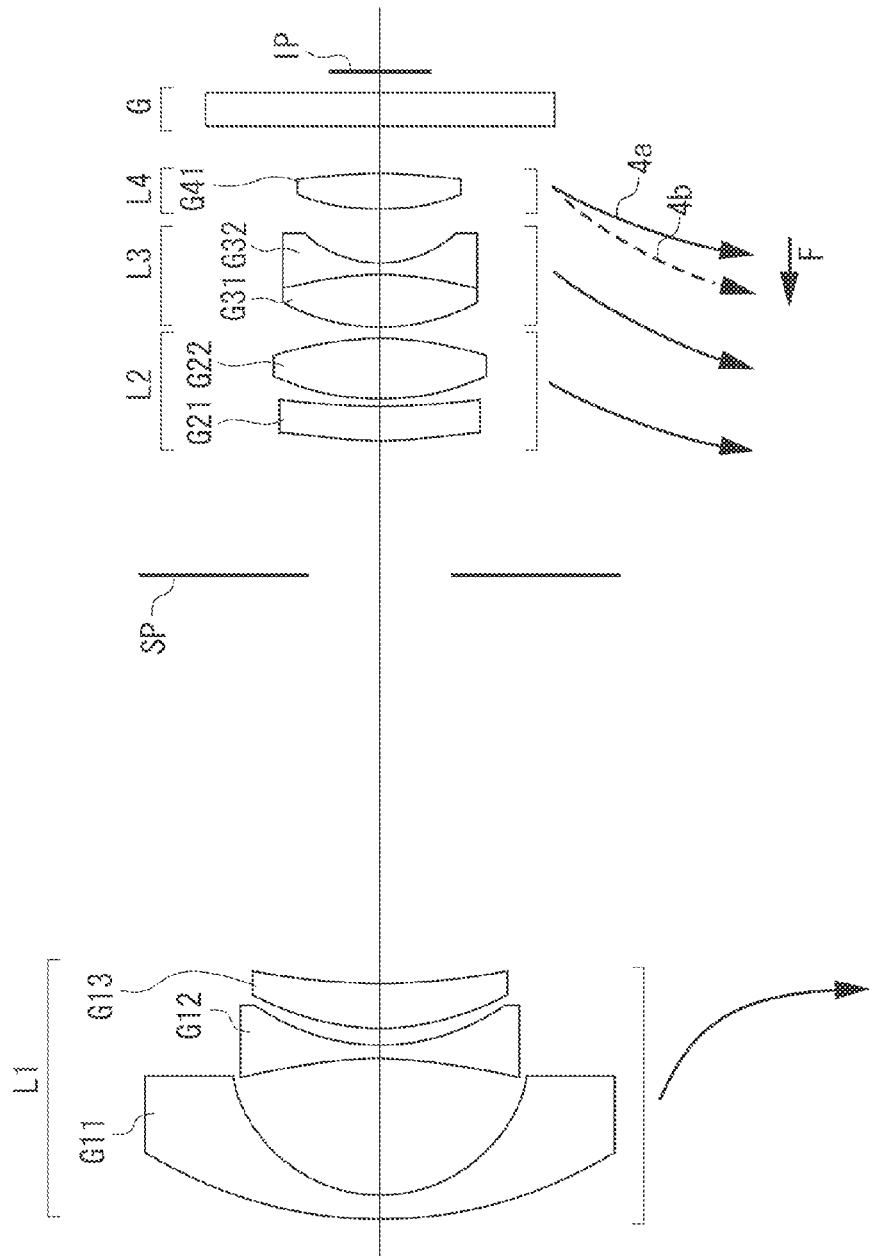
FIG. 9 is a lens cross-sectional view at a wide-angle end of a zoom lens according to a fifth exemplary embodiment.
Figure 10C:
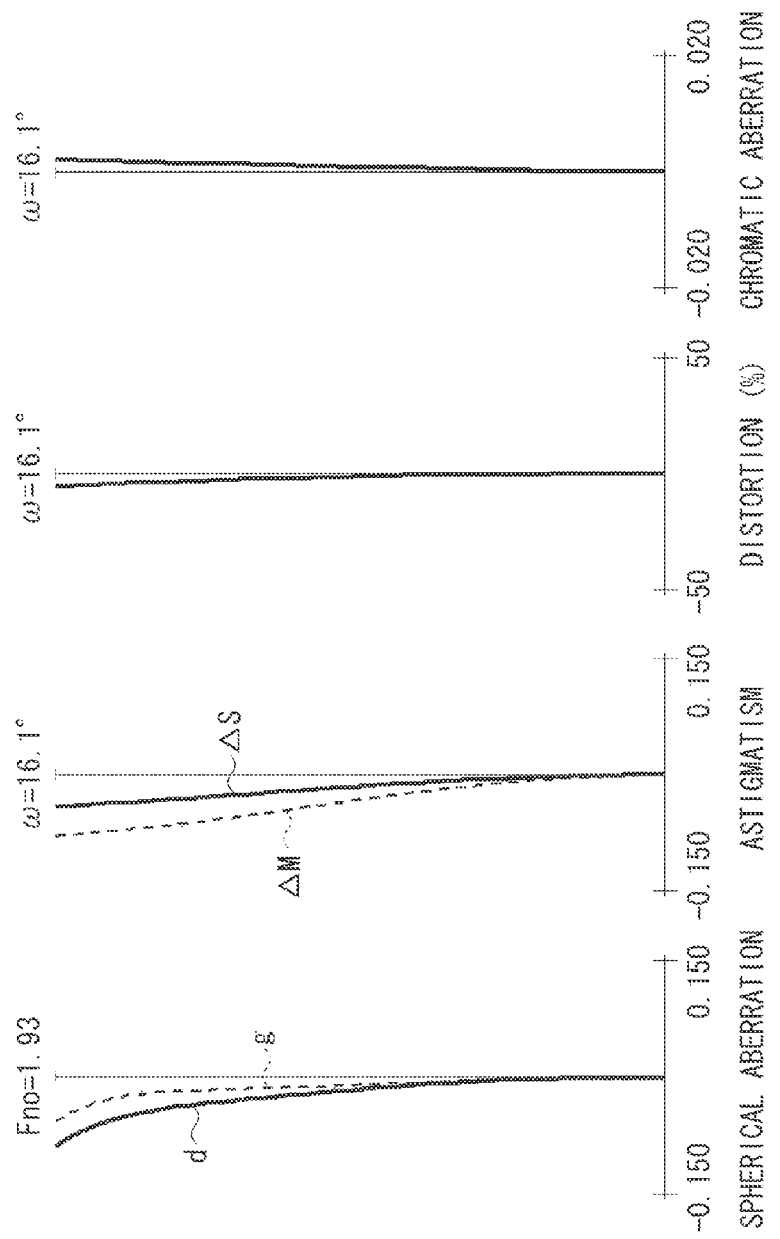

FIG. 9 is a lens cross-sectional view at a wide-angle end of a zoom lens according to a fifth exemplary embodiment. FIGS. 10A, 10B, and 10C are aberration diagrams at the wide-angle end, a middle zoom position, and a telephoto end, respectively, of the zoom lens according to the fifth exemplary embodiment. The fifth exemplary embodiment is a zoom lens in which a zoom ratio is 3.0 and an aperture ratio is approximately in the range of 1.35 to 1.93.

Figure 11:
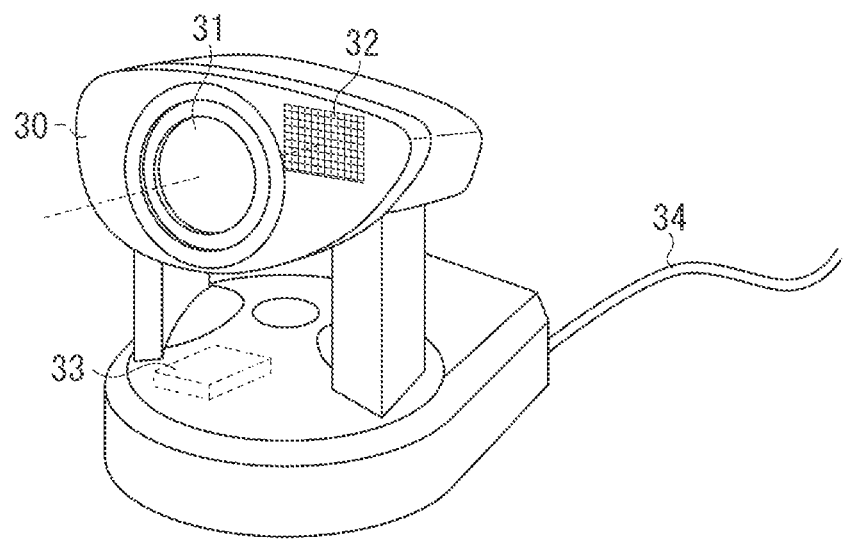
FIG. 11 is a schematic diagram illustrating main components of a monitoring camera according to an exemplary embodiment of the present invention.

FIG. 11 is a schematic diagram illustrating main components of a monitoring camera (image pickup apparatus) equipped with a zoom lens according to an exemplary embodiment of the present invention. The zoom lens of each exemplary embodiment is an imaging lens system used in an image pickup apparatus, such as a video camera, a digital still camera, a silver-halide film camera, a television camera, or the like. In the lens cross-sectional view, the left side is the object side (front side) and the right side is the image side (rear side). Further, in the lens cross-sectional view, when i denotes the order of lens units from the object side, Li represents the i-th lens unit.

The zoom lens of each exemplary embodiment includes, in order from an object side to an image side, a first lens unit L1 having negative refractive power, a second lens unit L2 having positive refractive power, a third lens unit L3 having negative refractive power, and a fourth lens unit L4 having positive refractive power. The zoom lens of each exemplary embodiment is a negative-lead type four-unit zoom lens constituted by four lens units.

In the lens cross-sectional view of each exemplary embodiment, an aperture stop SP is positioned between the first lens unit L1 and the second lens unit L2. The aperture stop SP is stationary during zooming and focusing. Since a driving device such as an actuator, or the like for moving the aperture stop SP need not be installed by fixing the aperture stop SP during zooming, the entire image pickup apparatus can be easily miniaturized. Further, the aperture stop SP may be located not between the first lens unit L1 and the second lens unit L2 but within the second lens unit L2 or between the second lens unit L2 and the third lens unit L3. Further, the aperture stop SP may be configured to be movable during zooming.

An optical block G corresponds to an optical filter, a faceplate, a low-pass filter, an infrared cut filter, or the like. IP represents an image plane. When the zoom lens is used as the imaging optical system of the video camera or the digital camera, the image plane IP corresponds to a solid-state image sensor (photoelectric conversion element), such as a charge-coupled device (CCD) sensor or a complementary metal-oxide semiconductor (CMOS) sensor. When the zoom lens is used as the imaging optical system of a silver-halide film camera, the image plane IP corresponds to a film surface. An arrow in the lens cross-sectional view indicates a movement locus of each lens unit during zooming (variable power) from the wide-angle end to the telephoto end.

In a spherical aberration diagram, Fno represents an F-number. Further, a solid line indicates d line (wavelength of 587.6 nm) and a dotted line indicates g line (wavelength 435.8 nm). In an astigmatism diagram, a solid line indicates a sagittal image plane with respect to d line and a dotted line indicates a meridional image plane with respect to d line. Distortion is plotted with respect to d line. In a diagram for chromatic aberration of magnification, aberration of g line with respect to d line is illustrated. ω represents a half angle of view. Further, the wide-angle end and the telephoto end in each exemplary embodiment below represent zoom positions when a lens unit for the variable power is positioned at respective ends of a range to move along an optical axis under a constraint on a mechanism.

In each exemplary embodiment, a balance between the refractive power of the first lens unit L1 and the refractive power of the second lens unit L2 is appropriately set and the refractive power of the first lens unit L1 when achieving a wide angle of view (when a focal length of the entire zoom lens is shortened) is appropriately set to implement appropriate correction of variation in an image plane accompanied with achievement of the wide angle of view and the zooming. The first lens unit L1 needs to have negative refractive power which is comparatively strong for achieving the wide angle of view and further, needs to have an appropriate refractive power as the lens unit in which the image plane variation is corrected. Further, the second lens unit L2 also needs to have an appropriate refractive power to impose a variable power burden on the second lens unit L2. As such, the refractive power of the first lens unit L1 and the refractive power of the second lens unit L2 are appropriately set to acquire a zoom lens having the entire lens system which is compact at the wide angle of view and has high optical performance in the entire zoom range.

In regard to focusing, a rear focusing method to perform focusing by moving the fourth lens unit L4 on the optical axis is adopted. When focusing is performed to a close object from an infinitely-distant object at the telephoto end, focusing is achieved by continuously forwarding the fourth lens unit L4 toward the front side, as indicated by an arrow F in the lens cross-sectional view. A curve 4a in the lens cross-sectional view represents a movement locus for correcting the image plane variation caused by zooming to the telephoto end from the wide-angle end when focusing is performed on the infinitely-distant object. A curve 4b represents a movement locus for correcting the image plane variation caused by zooming to the telephoto end from the wide-angle end when focusing is performed on the close object. Herein, the number of lens elements is small and focusing is performed with the fourth lens unit L4 located closest to the image side to thereby suppress the variation of aberration caused by focusing and further, to rapidly perform focusing.

In each exemplary embodiment, correcting spherical aberration or curvature of field is excellently performed, by appropriately using an aspheric lens. A material of the aspheric lens is not limited to glass, and a hybrid type aspheric lens in which an aspheric surface is formed of a resin material on the spherical lens made of glass or an aspheric lens formed of a plastic material may be used.

In each exemplary embodiment, when a focal length of the first lens unit L1 is denoted by f1, a focal length of the second lens unit L2 is denoted by f2, and a focal length of the entire zoom lens at the wide-angle end is denoted by fw, the following conditions are satisfied:

$$-1.05 < f1/f2 < -0.55 \qquad (1)$$

$$-6.0 < f1/fw < -3.5 \qquad (2)$$

The condition (1) defines a ratio between the focal length f1 of the first lens unit L1 and the focal length f2 of the second lens unit L2. When the ratio exceeds an upper limit value of the condition (1) and thus an absolute value of the focal length f1 of the first lens unit L1 is decreased, the negative refractive power is excessively strengthened, and as a result, a correction balance of curvature of field or chromatic aberration deteriorates, which is not desirable. Further, when the ratio exceeds the upper limit value of the condition (1) and thus the focal length f2 of the second lens unit L2 is lengthened, the positive refractive power is excessively weakened, and as a result, a movement amount of the second lens unit L2 during zooming is increased and a total lens length or a front lens diameter becomes large, which is not desirable.

When the ratio exceeds a lower limit value of the condition (1) and thus the absolute value of the focal length f1 of the first lens unit L1 is increased, the negative refractive power is excessively weakened. Therefore, the movement amount during zooming of the first lens unit L1 performing image-plane correction is increased, and as a result, the total lens length becomes large, which is not desirable. Further, when the ratio exceeds the lower limit value of the condition (1) and thus the focal length f2 of the second lens unit L2 is shortened, the positive refractive power is excessively strengthened, and as a result, spherical aberration frequently occurs, which is not desirable.

The condition (2) defines a ratio between the focal length f1 of the first lens unit L1 and the focal length fw of the entire zoom lens at the wide-angle end. When the ratio exceeds an upper limit value of the condition (2) and thus the absolute value of the focal length f1 of the first lens unit L1 is decreased, the negative refractive power is excessively strengthened, and as a result, curvature of field or chromatic aberration may not be sufficiently corrected in the entire zoom area, which is not desirable. Further, when the ratio exceeds the lower limit value of the condition (2) and thus the absolute value of the focal length f1 of the first lens unit L1 is increased, the negative refractive power is excessively weakened. As a result, it is difficult to achieve a wide angle of view and further, the movement amount of the first lens unit L1 during zooming is increased, and as a result, the total lens length or the front lens diameter becomes large, which is not desirable.

In each exemplary embodiment, each element is appropriately set to satisfy the conditions (1) and (2) as described above. As a result, a zoom lens is acquired, in which the entire optical system is miniaturized and has a wide angle of view and various aberrations are excellently corrected in the entire zoom range. Further, in each exemplary embodiment, numerical ranges of the conditions (1) and (2) can be set as follows:

$$-1.03 < f1/f2 < -0.60 \qquad (1a)$$

$$-5.0 < f1/fw < -3.5 \qquad (2a)$$

Further, in each exemplary embodiment, one or more of the following conditions are more desirably satisfied. Herein, a focal length of the third lens unit L3 is denoted by f3, a focal length of the fourth lens unit L4 is denoted by f4, at least one of lenses included in the first lens unit L1 to the fourth lens unit L4 is an aspheric lens, and a refractive index at the d line of the aspheric lens is denoted by Ndasph. Further, in regard to two or more negative lenses and one or more positive lenses, which are included in the first lens unit L1, an average value of refractive indices at the d line of the two or more negative lenses is denoted by Nd1n and an average value of refractive indices at the d line of the one or more positive lenses is denoted by Nd1p. Further, lateral magnifications of the second lens units L2 at the wide-angle end and the telephoto end are denoted respectively by β2w and β2t, a composite lateral magnification of the third lens unit L3 and the fourth lens unit L4 at the wide-angle end is denoted by β34w, and a composite lateral magnification of the third lens unit and the fourth lens unit at the telephoto end is denoted by β34t. In addition, a focal length of the entire zoom lens at the telephoto end is denoted by ft, a movement amount of the third lens unit L3 during zooming from the wide-angle end to the telephoto end is denoted by M3, and a movement amount of the fourth lens unit L4 during zooming from the wide-angle end to the telephoto end is denoted by M4. Herein, the movement amount refers to a difference between positions of the respective lens units on the optical axis at the wide-angle end and the telephoto end and a sign of the movement amount is set to positive when the lens unit is positioned closer to the image side at the telephoto end than at the wide-angle end.

In this case, one or more of the following conditions can be satisfied:

$$-14.0 < f3/fw < -3.5 \qquad (3)$$

$$4.0 < f4/fw < 8.0 \qquad (4)$$

$$1.60 < Ndasph < 2.10 \qquad (5)$$

$$1.68 < Nd1n < 2.10 \qquad (6)$$

$$1.80 < Nd1p < 2.20 \qquad (7)$$

$$2.8 < |\beta2t/\beta2w| < 5.5 \qquad (8)$$

$$0.70 < |\beta34t/\beta34w| < 1.20 \qquad (9)$$

$$0.40 < |M3|/\sqrt{(fw \cdot ft)} < 1.00 \qquad (10)$$

$$0.35 < |M4|/\sqrt{(fw \cdot ft)} < 1.10 \qquad (11)$$

The condition (3) defines a ratio between the focal length f3 of the third lens unit L3 and the focal length fw of the entire zoom lens at the wide-angle end. When the ratio exceeds an upper limit value of the condition (3) and thus an absolute value of the focal length f3 of the third lens unit L3 is decreased, the negative refractive power is excessively strengthened, and as a result, it is difficult to keep a correction balance of each aberration. As a result, it is not desirable because curvature of field or the aberration such as chromatic aberration, or the like in the entire zoom area may not sufficiently be corrected. Further, it is not desirable because sensitivity is increased and it is difficult to maintain stable performance in a manufacturing process. Further, when the ratio exceeds a lower limit value of the condition (3) and thus the absolute value of the focal length f3 of the third lens unit L3 is increased, the negative refractive power is excessively weakened, and as a result, the aberration may not sufficiently be corrected, which is not desirable.

The condition (4) defines a ratio between the focal length f4 of the fourth lens unit L4 and the focal length fw of the entire zoom lens at the wide-angle end. When the ratio exceeds an upper limit value of the condition (4) and thus the focal length f4 of the fourth lens unit L4 is increased, a back focus is increased, and as a result, the total lens length is increased, which is not desirable. Further, when the ratio exceeds a lower limit value of the condition (4) and thus the focal length f4 of the fourth lens unit L4 is shortened, the positive refractive power is excessively strengthened, and as a result, the aberration may not sufficiently be corrected in the entire zoom area, which is not desirable.

The condition (5) defines a value of the refractive index Ndasph at the d line of the aspheric lens. When the refractive index, which is more than an upper limit value of the condition (5) is increased, various aberrations including spherical aberration frequently occur, which is not desirable. Further, when the refractive index which exceeds a lower limit value of the condition (5) is decreased, the thickness of the lens needs to be increased to secure a desired refractive power, and as a result, the total lens length is increased, which is not desirable.

The condition (6) defines the average value Nd1$n$ of refractive indices at the d line of the two or more negative lenses in the first lens unit L1. When the average value exceeds an upper limit value of the condition (6) and thus the refractive power is increased, the refractive power is excessively strengthened, so that it is difficult to keep balances of various aberrations, which is not desirable. Further, when the average value exceeds a lower limit value of the condition (6) and thus when the refractive index is decreased, the refractive power is excessively weakened, so that it is difficult to achieve a wide angle of view, which is not desirable. Further, it is not desirable because the shortening of a radius of curvature or the increase in thickness of the lens is needed to strengthen the negative refractive power, and as a result, the total lens length becomes large.

The condition (7) defines the average value Nd1$p$ of refractive indices at the d line of the one or more positive lenses in the first lens unit L1. When the average value exceeds an upper limit value of the condition (7) and thus the refractive index is increased, the refractive power is excessively strengthened, and as a result, it is difficult to keep balances of various aberrations and in particular, spherical aberration at the telephoto end easily occurs in an under direction, which is not desirable. Further, when the average value exceeds a lower limit value of the condition (7) and thus the refractive index is decreased, spherical aberration at the telephoto end easily occurs in an over direction, which is not desirable. Further, it is not desirable because the shortening of the radius of curvature or the increase in thickness of the lens is needed to strengthen the positive refractive power, and as a result, the total lens length becomes large.

The condition (8) defines a ratio between the lateral magnification $\beta 2t$ at the telephoto end and the lateral magnification $\beta 2w$ at the wide-angle end of the second lens unit L2. When the ratio exceeds an upper limit value of the condition (8) and thus a variable power ratio of the second lens unit L2 is increased, the refractive power of the second lens unit L2 is excessively strengthened, and as a result, it is difficult to correct chromatic aberration of magnification or the variation of curvature of field, which is not desirable. When the ratio exceeds a lower limit value of the condition (8) and thus the variable power ratio of the second lens unit L2 is decreased, a variable power ratio of the third lens unit L3 needs to be increased. In order to increase the variable power ratio, the movement amount of the lens unit needs to be increased, and it is difficult to correct coma or spherical aberration and the total lens length is increased, which is not desirable.

The condition (9) defines a ratio between the composite lateral magnification $\beta 34t$ at the telephoto end and the composite lateral magnification $\beta 34w$ at the wide-angle end in the third lens unit L3 and the fourth lens unit L4. When the ratio exceeds an upper limit value of the condition (9) and thus a composite variable power ratio of the third lens unit L3 and the fourth lens unit L4 is increased, the refractive power is excessively strengthened, and as a result, particularly, spherical aberration or coma occurs in the entire zoom area, which is not desirable. Further, when the ratio exceeds a lower limit value of the condition (9) and thus the composite variable power ratio is decreased, variable power burdens of the third lens unit L3 and the fourth lens unit L4 are decreased, and as a result, a variable power burden of the second lens unit L2 is increased. As a result, the refractive power of the second lens unit L2 needs to be strengthened and the variation of various aberrations such as spherical aberration, and the like caused by zooming is increased, which is not desirable.

The condition (10) defines a movement amount M3 of the third lens unit L3 during zooming from the wide-angle end to the telephoto end. When the movement amount of the third lens unit L3, which is more than an upper limit value of the condition (10) is increased, the total lens length becomes large, which is not desirable. Further, when the movement amount exceeds a lower limit of the condition (10) and thus is decreased, a desired zoom ratio may not be acquired, which is not desirable.

The condition (11) defines a movement amount M4 of the fourth lens unit L4 during zooming from the wide-angle end to the telephoto end. When the movement amount of the fourth lens unit L4 is increased to be more than an upper limit value of the condition (11), the total lens length becomes large, which is not desirable. Further, when the movement amount is decreased to be a lower limit of the condition (11), a desired zoom ratio may not be acquired, which is not desirable.

Further, desirably, numerical ranges of the conditions (3) to (11) can be set as follows:

$$-12.0 < f3/fw < -4.0 \tag{3a}$$

$$5.0 < f4/fw < 7.0 \tag{4a}$$

$$1.65 < Ndasph < 1.95 \tag{5a}$$

$$1.72 < Nd1n < 2.03 \tag{6a}$$

$$1.90 < Nd1p < 2.15 \tag{7a}$$

$$3.1 < |\beta 2t/\beta 2w| < 4.5 \tag{8a}$$

$$0.75 < |\beta 34t/\beta 34w| < 1.10 \tag{9a}$$

$$0.55 < M3/\sqrt{(fw \cdot ft)} < 0.90 \tag{10a}$$

$$0.45 < M4/\sqrt{(fw \cdot ft)} < 0.95 \tag{11a}$$

In each exemplary embodiment, each element is configured as above, to acquire a zoom lens which has the small-sized entire optical system and has high optical performance to sufficiently correct various aberrations including axial chromatic aberration, chromatic aberration of magnification, spherical aberration, and curvature of field even at a wide angle of view, in the entire zoom range. Further, the above conditions are arbitrarily combined in plural to thereby further improve the effect of embodiments of the present invention.

Next, a detailed lens configuration of each exemplary embodiment will be described.

[First Exemplary Embodiment]

A first lens unit L1 includes a negative lens G11 having a surface at the object side which is convex and having a meniscus shape, a negative lens G12 having a biconcave shape, and a positive lens G13 having a surface at the object side which is convex and having a meniscus shape. A second lens unit L2 includes a positive lens G21 having a surface at the object side which is convex and having a meniscus shape and a positive lens G22 having a biconvex shape. In this case, both surfaces of the positive lens G21 have an aspheric shape. A third lens unit L3 includes a positive lens G31 having a surface at the object side which is convex and having a meniscus shape and a negative lens G32 having a surface at the object side which is convex and having a meniscus shape. A fourth lens unit L4 includes a positive lens G41 having a surface at the object side which is convex and having a meniscus shape. In this case, both surfaces of the positive lens G41 have an aspheric shape.

[Second Exemplary Embodiment]

A first lens unit L1 includes a negative lens G11 having a surface at the object side which is convex and having a meniscus shape, a lens G12 having a biconcave shape, and a positive lens G13 having a surface at the object side which is convex and having a meniscus shape. A second lens unit L2 includes a positive lens G21 having a biconvex shape and a positive lens G22 having a biconvex shape. In this case, both surfaces of the positive lens G21 have an aspheric shape. A third lens unit L3 includes a positive lens G31 having a surface at the object side which is convex and having a meniscus shape and a negative lens G32 having a surface at the object side which is convex and having a meniscus shape. In this case, the positive lens G31 and the negative lens G32 are cemented together. A fourth lens unit L4 includes a positive lens G41 having a biconvex shape.

[Third Exemplary Embodiment]

A first lens unit L1 includes a negative lens G11 having a surface at the object side which is convex and having a meniscus shape, a negative lens G12 having a biconcave shape, and a positive lens G13 having a surface at the object side which is convex and having a meniscus shape. A second lens unit L2 includes a positive lens G21 having a surface at the object side which is convex and having a meniscus shape and a positive lens G22 having a biconvex shape. In this case, a surface at the object side of the positive lens G21 has an aspheric shape. A third lens unit L3 includes a positive lens G31 having a biconvex shape and a negative lens G32 having a biconcave shape. In this case, the positive lens G31 and the negative lens G32 are cemented together. A fourth lens unit L4 includes a positive lens G41 having a biconvex shape.

[Fourth Exemplary Embodiment]

A first lens unit L1 includes a negative lens G11 having a surface at the object side which is convex and having a meniscus shape, a negative lens G12 having a biconcave shape, and a positive lens G13 having a surface at the object side which is convex and having a meniscus shape. In this case, both surfaces of the positive lens G11 have an aspheric shape. A second lens unit L2 includes a positive lens G21 having a surface at the object side which is convex and having a meniscus shape and a positive lens G22 having a biconvex shape. In this case, both surfaces of the positive lens G21 have an aspheric shape. A third lens unit L3 includes a positive lens G31 having a surface at the object side which is convex and having a meniscus shape and a negative lens G32 having a surface at the object side which is convex and having a meniscus shape. A fourth lens unit L4 includes a positive lens G41 having a biconvex shape.

[Fifth Exemplary Embodiment]

A first lens unit L1 includes a negative lens G11 having a surface at the object side which is convex and having a meniscus shape, a negative lens G12 having a biconcave shape, and a positive lens G13 having a surface at the object side which is convex and having a meniscus shape. A second lens unit L2 includes a positive lens G21 having a surface at the object side which is convex and having a meniscus shape and a positive lens G22 having a biconvex shape. In this case, a surface at the object side of the positive lens G21 has an aspheric shape. A third lens unit L3 includes a positive lens G31 having a biconvex shape and a negative lens G32 having a biconcave shape. In this case, the positive lens G31 and the negative lens G32 are cemented together. A fourth lens unit L4 includes a positive lens G41 having a biconvex shape.

As described above, although the exemplary embodiments of the present invention have been described, the present invention is not limited to the exemplary embodiments and various modifications or changes can be made within the scope of the spirit. Further, in the acquired image information, distortion can be electrically corrected by a signal processing circuit that processes image data from a solid-state image sensor (photoelectric conversion element) to output an image having less distortion.

Next, an exemplary embodiment of a monitoring camera (image pickup apparatus) using the zoom lens according to the exemplary embodiment of the present invention as a photographic optical system will be described with reference to FIG. 11. In FIG. 11, the monitoring camera includes a monitoring camera body 30, a photographic optical system 31 constituted by any one zoom lens described in the first to fifth exemplary embodiments, a solid-state image sensor (photoelectric conversion element) 32, such as a CCD sensor a CMOS sensor, that is incorporated in the camera body to receive an object image formed by the photographic optical system 31, a memory 33 that records information corresponding to the object image which is photoelectrically converted by the solid-state image sensor 32, and a network cable 34 for transmitting the object image photoelectrically converted by the solid-state image sensor 32.

As such, the zoom lens according to the exemplary embodiment of the present invention is applied to the image pickup apparatus such as a monitoring camera, or the like to acquire an image pickup apparatus having a small size and high optical performance.

Next, numerical examples 1 to 5 corresponding to the first to fifth exemplary embodiments of the present invention, respectively, will be described. In each numerical example, i represents the order of an optical surface counted from the object side. ri represents a radius of curvature of an i-th optical surface (i-th surface), di represents a distance between the i-th surface and an (i+1)th surface, and ndi and vdi represent a refractive index and an Abbe number of a material of an i-th optical member at the d line, respectively. Further, when k represents eccentricity, A4, A6, A8, and A10 represent aspheric coefficients, and a displacement in an optical axial direction at a position of a height h from the optical axis is denoted by x based on a surface vertex, an aspheric shape is expressed by $$x = (h^2/R)/[1+\{1-(1+k)(h/R)^2\}^{1/2}] + A4h^4 + A6h^6 + A8h^8 + A10h^{10},$$

where R represents a paraxial radius of curvature.

In the numerical examples, two surfaces closest to the image side are surfaces of optical blocks such as a filter, a faceplate, and the like. SP represents an aperture stop (alternatively, an iris stop), and G represents a glass block, such as a crystal low-pass filter or an infrared cut filter. IP represents an image plane on which a photosensitive surface of the solid-state image sensor (photoelectric conversion element), such as a CCD sensor or a CMOS sensor, is positioned. Further, the relationship between each numerical example and the aforementioned conditions are set forth in Table 1.

Numerical Example 1

Unit mm

Surface data

| Surface number | r | d | nd | vd |
|---|---|---|---|---|
| 1 | 32.289 | 1.4 | 1.883 | 40.8 |
| 2 | 9.583 | 7.81 | | |
| 3 | −45.79 | 0.8 | 1.883 | 40.8 |
| 4 | 18.629 | 1 | | |
| 5 | 20.741 | 2.07 | 2.10205 | 16.8 |
| 6 | 65.284 | (variable) | | |
| 7 (stop) | ∞ | (variable) | | |
| 8* | 16.21 | 2.35 | 1.85135 | 40.1 |
| 9* | 92.447 | 0.15 | | |
| 10 | 11.59 | 3.65 | 1.59282 | 68.6 |
| 11 | −67.289 | (variable) | | |
| 12 | 19.522 | 1.5 | 1.48749 | 70.2 |
| 13 | 1306.673 | 0.2 | | |
| 14 | 15.248 | 0.6 | 1.95906 | 17.5 |
| 15 | 5.638 | (variable) | | |
| 16* | 12.138 | 2.2 | 1.85135 | 40.1 |
| 17* | 1333.833 | (variable) | | |
| 18 | ∞ | 2 | 1.52 | 61.4 |
| Image plane | ∞ | | | |

Aspheric surface data

8th surface

K = −1.98534e+000  A4 = −2.85490e−005  A6 = −1.30547e−006
A8 = −7.15889e−009  A10 = −1.43811e−010

9th surface

K = 0.00000e+000  A4 = 3.93809e−005  A6 = −1.11693e−006
A8 = −1.15709e−008  A10 = 0

16th surface

K = 1.68270e+000  A4 = 3.55127e−005  A6 = 1.82808e−007
A8 = −3.69772e−009  A10 = 0

17th surface

K = −2.65991e+009  A4 = 1.07621e−004  A6 thru A10 = 0

Various data
Zoom ratio 3.9

| | Wide-angle | Middle | Telephoto |
|---|---|---|---|
| Focal length | 2.45 | 5.00 | 9.56 |
| F-number | 1.29 | 1.49 | 2.21 |
| Half angle of view | 75.8 | 24.3 | 12.7 |
| Image height | 3.00 | 3.00 | 3.00 |
| Total lens length | 69.57 | 50.50 | 44.83 |
| BF (back focus) Distance | 5.46 | 8.21 | 13.16 |
| d6 | 26.62 | 7.55 | 1.88 |
| d7 | 10.23 | 6.80 | 1.70 |
| d11 | 0.50 | 0.57 | 1.04 |
| d15 | 2.35 | 2.96 | 2.65 |
| d17 | 1.99 | 4.74 | 9.69 |

Numerical Example 2

Unit mm

| Surface number | r | d | nd | vd |
|---|---|---|---|---|
| 1 | 34.975 | 1.4 | 1.88300 | 40.8 |
| 2 | 9.653 | 7.96 | | |
| 3 | −36.745 | 0.8 | 1.62299 | 58.2 |
| 4 | 16.123 | 1 | | |
| 5 | 18.217 | 2 | 1.95906 | 17.5 |
| 6 | 39.536 | (variable) | | |
| 7 (stop) | ∞ | (variable) | | |
| 8* | 20.976 | 2.35 | 1.85135 | 40.1 |
| 9* | −159.5 | 0.15 | | |
| 10 | 12.833 | 3.65 | 1.59282 | 68.6 |
| 11 | −26.956 | (variable) | | |
| 12 | 17.106 | 1.2 | 1.77250 | 49.6 |
| 13 | 25.745 | 0.6 | 1.95906 | 17.5 |
| 14 | 6.79 | (variable) | | |
| 15 | 16.288 | 2.2 | 1.88300 | 40.8 |
| 16 | −49.874 | (variable) | | |
| 17 | ∞ | 2 | 1.52000 | 61.4 |
| Image plane | ∞ | | | |

Aspheric surface data

8th surface

K = −1.98534e+000  A4 = −1.52588e−004  A6 = −1.91812e−006
A8 = −3.93201e−008  A10 = 0

9th surface

K = 0.00000e+000  A4 = −5.66132e−005  A6 = −2.01336e−006
A8 = −1.84260e−008  A10 = 0

Various data
Zoom ratio 3.4

| | Wide-angle | Middle | Telephoto |
|---|---|---|---|
| Focal length | 2.50 | 4.50 | 8.61 |
| F-number | 1.33 | 1.48 | 2.00 |
| Half angle of view | 75.7 | 27.0 | 14.0 |
| Image height | 3.00 | 3.00 | 3.00 |
| Total lens length | 68.57 | 51.76 | 43.62 |
| BF Distance | 5.35 | 7.64 | 11.85 |
| d6 | 26.83 | 10.02 | 1.88 |
| d7 | 8.45 | 5.73 | 1.70 |
| d11 | 0.93 | 0.88 | 1.46 |
| d14 | 3.00 | 3.48 | 2.73 |
| d16 | 2.94 | 5.24 | 9.44 |

Numerical Example 3

Unit mm

Surface data

| Surface number | r | d | nd | vd |
|---|---|---|---|---|
| 1 | 30.105 | 1.4 | 1.88300 | 40.8 |
| 2 | 9.304 | 8.25 | | |
| 3 | −33.876 | 0.87 | 1.69680 | 55.5 |
| 4 | 17.481 | 1.02 | | |
| 5 | 18.552 | 2.19 | 1.95906 | 17.5 |
| 6 | 45.536 | (variable) | | |
| 7 (stop) | ∞ | (variable) | | |
| 8* | 21.416 | 2.4 | 1.69350 | 53.2 |

-continued

| Unit mm | | | | |
|---|---|---|---|---|
| 9 | 103.258 | 0.4 | | |
| 10 | 15.438 | 3.8 | 1.59282 | 68.6 |
| 11 | −21.319 | (variable) | | |
| 12 | 17.344 | 2.78 | 1.88300 | 40.8 |
| 13 | −15.471 | 0.7 | 1.76182 | 26.5 |
| 14 | 6.519 | (variable) | | |
| 15 | 11.304 | 2.2 | 1.59282 | 68.6 |
| 16 | −44.287 | (variable) | | |
| 17 | ∞ | 2 | 1.52000 | 61.4 |
| Image plane | ∞ | | | |

Aspheric surface data
$8^{th}$ surface

K = −1.98534e+000   A4 = −1.44234e−004   A6 = −2.97760e−007
A8 = −9.35980e−009   A10 = 0

Various data
Zoom ratio 3.0

| | Wide-angle | Middle | Telephoto |
|---|---|---|---|
| Focal length | 2.50 | 4.51 | 7.42 |
| F-number | 1.33 | 1.47 | 1.89 |
| Half angle of view | 74.4 | 26.9 | 16.3 |
| Image height | 3.00 | 3.00 | 3.00 |
| Total lens length | 69.53 | 52.52 | 46.71 |
| BF | 5.35 | 7.63 | 10.84 |
| Distance | | | |
| d6 | 26.10 | 9.09 | 3.28 |
| d7 | 7.84 | 5.35 | 1.70 |
| d11 | 0.76 | 0.97 | 1.41 |
| d14 | 2.78 | 2.78 | 2.78 |
| d16 | 2.77 | 5.06 | 8.27 |

Numerical Example 4

| Unit mm | | | | |
|---|---|---|---|---|
| Surface data | | | | |
| Surface number | r | d | nd | vd |
| 1* | 225.791 | 1.6 | 1.85135 | 40.1 |
| 2* | 9.611 | 7.07 | | |
| 3 | −52.9 | 0.9 | 1.80610 | 40.9 |
| 4 | 34.341 | 1 | | |
| 5 | 32.005 | 2.14 | 2.10205 | 16.8 |
| 6 | 847.476 | (variable) | | |
| 7 (stop) | ∞ | (variable) | | |
| 8* | 14.624 | 2.35 | 1.85135 | 40.1 |
| 9* | 31.13 | 0.15 | | |
| 10 | 13.14 | 3.65 | 1.59282 | 68.6 |
| 11 | −39.402 | (variable) | | |
| 12 | 13.37 | 1.81 | 1.88300 | 40.8 |
| 13 | 46.167 | 0.2 | | |
| 14 | 17.065 | 0.6 | 1.95906 | 17.5 |
| 15 | 5.721 | (variable) | | |
| 16 | 12.494 | 1.91 | 1.75700 | 47.8 |
| 17 | −149.845 | (variable) | | |
| 18 | ∞ | 2 | 1.52000 | 61.4 |
| Image surface | ∞ | | | |

Aspheric surface data
$1^{st}$ surface

K = 1.05652e+000   A4 = 8.64783e−006   A6 = −6.72559e−009
A8 to A10 = 0

$2^{nd}$ surface

K = −2.03156e−001   A4 = −2.12998e−005   A6 to A10 = 0

$8^{th}$ surface

K = −2.77376e+000   A4 = −4.74001e−005   A6 = −2.24480e−006
A8 = 2.51231e−010   A10 = −1.92669e−010

$9^{th}$ surface

K = 0.00000e+000   A4 = −3.24620e−005   A6 = −2.04908e−006
A8 = −4.88872e−010   A10 = 0

Various data
Zoom ratio 3.2

| | Wide-angle | Middle | Telephoto |
|---|---|---|---|
| Focal length | 2.50 | 4.59 | 8.00 |
| F-number | 1.29 | 1.48 | 1.94 |
| Half angle of view | 76.0 | 26.3 | 15.1 |
| Image height | 3.00 | 3.00 | 3.00 |
| Total lens length | 69.54 | 50.45 | 42.65 |
| BF | 5.36 | 6.98 | 9.92 |
| Distance | | | |
| d6 | 28.78 | 9.73 | 1.88 |
| d7 | 8.64 | 5.81 | 1.70 |
| d11 | 0.50 | 0.51 | 0.98 |
| d15 | 2.20 | 3.36 | 4.10 |
| d17 | 2.92 | 4.59 | 7.48 |

Numerical Example 5

| Unit mm | | | | |
|---|---|---|---|---|
| Surface data | | | | |
| Surface number | r | d | nd | vd |
| 1 | 26.683 | 1.5 | 1.88300 | 40.8 |
| 2 | 9.075 | 8.27 | | |
| 3 | −30.639 | 0.85 | 1.67790 | 55.3 |
| 4 | 13.19 | 1 | | |
| 5 | 15.539 | 2.74 | 1.92286 | 18.9 |
| 6 | 40.106 | (variable) | | |
| 7 (stop) | ∞ | (variable) | | |
| 8* | 23.673 | 2.1 | 1.69350 | 53.2 |
| 9 | 43.821 | 0.4 | | |
| 10 | 15.18 | 3.79 | 1.59282 | 68.6 |
| 11 | −18.44 | (variable) | | |
| 12 | 12.203 | 3.2 | 1.69680 | 55.5 |
| 13 | −19.139 | 0.7 | 1.72151 | 29.2 |
| 14 | 6.799 | (variable) | | |
| 15 | 13.812 | 2.2 | 1.59282 | 68.6 |
| 16 | −29.951 | (variable) | | |
| 17 | ∞ | 2 | 1.52000 | 61.4 |
| Image plane | ∞ | | | |

Aspheric surface data
$8^{th}$ surface

K = −1.98534e+000   A4 = −1.31792e−004   A6 = −3.36609e−007
A8 = −9.73949e−009   A10 = 0

Various data
Zoom ratio 3.0

| | Wide-angle | Middle | Telephoto |
|---|---|---|---|
| Focal length | 2.48 | 4.32 | 7.50 |
| F-number | 1.35 | 1.48 | 1.93 |

-continued

| | Unit mm | | |
|---|---|---|---|
| Half angle of view | 75.6 | 28.2 | 16.1 |
| Image height | 3.00 | 3.00 | 3.00 |
| Total lens length | 69.53 | 54.35 | 47.83 |
| BF | 5.35 | 7.85 | 11.95 |
| Distance | | | |
| d6 | 24.75 | 9.57 | 3.04 |
| d7 | 8.15 | 5.54 | 1.70 |
| d11 | 0.60 | 0.40 | 0.98 |
| d14 | 3.25 | 3.55 | 2.72 |
| d16 | 2.79 | 5.29 | 9.39 |

| | | Numerical Examples | | | | |
|---|---|---|---|---|---|---|
| Conditions | | 1 | 2 | 3 | 4 | 5 |
| (1) | f1/f2 | −0.94 | −1.02 | −0.80 | −0.97 | −0.69 |
| (2) | f1/fw | −3.9 | −3.9 | −3.8 | −4.5 | −3.6 |
| (3) | f3/fw | −5.4 | −4.8 | −8.5 | −8.0 | −11.1 |
| (4) | f4/fw | 5.9 | 5.7 | 6.2 | 6.1 | 6.5 |
| (5) | Ndasph | 1.85 | 1.85 | 1.69 | 1.85 | 1.69 |
| (6) | Nd1n | 1.88 | 1.75 | 1.79 | 1.83 | 1.78 |
| (7) | Nd1P | 2.10 | 1.96 | 1.96 | 2.10 | 1.92 |
| (8) | |β2t/β2w| | 4.0 | 3.5 | 3.4 | 3.4 | 3.8 |
| (9) | |β34t/β34w| | 1.0 | 1.0 | 0.9 | 0.9 | 0.8 |
| (10) | |M3|/√(fw·ft) | 0.81 | 0.69 | 0.70 | 0.77 | 0.77 |
| (11) | |M4|/√(fw·ft) | 0.78 | 0.72 | 0.70 | 0.54 | 0.84 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-123560 filed May 30, 2012, which is hereby incorporated by reference herein in its entirety.

What is claimed is:

1. A zoom lens comprising, in order from an object side to an image side:
   a first lens unit having negative refractive power;
   a second lens unit having positive refractive power;
   a third lens unit having negative refractive power; and
   a fourth lens unit having positive refractive power,
   wherein each lens unit moves during zooming from a wide-angle end to a telephoto end, and
   wherein, when a focal length of the first lens unit is denoted by f1, a focal length of the second lens unit is denoted by f2, and a focal length of the entire zoom lens at the wide-angle end is denoted by fw, the following conditions are satisfied:

$-1.05 < f1/f2 < -0.55$ $-6.0 < f1/fw < -3.5$.

2. The zoom lens according to claim 1, wherein, when a focal length of the third lens unit is denoted by f3, the following condition is satisfied:

$-14.0 < f3/fw < -3.5$.

3. The zoom lens according to claim 1, wherein, when a focal length of the fourth lens unit is denoted by f4, the following condition is satisfied:

$4.0 < f4/fw < 8.0$.

4. The zoom lens according to claim 1, wherein the zoom lens includes at least one aspheric lens, and
   wherein, when a refractive index at the d line of the aspheric lens is denoted by Ndasph, the at least one aspheric lens satisfies the following condition:

$1.60 < Ndasph < 2.10$.

5. The zoom lens according to claim 1, wherein the first lens unit includes two or more negative lenses, and
   wherein, when an average value of refractive index at the d line of the two or more negative lenses is denoted by Nd1n, the following condition is satisfied:

$1.68 < Nd1n < 2.10$.

6. The zoom lens according to claim 1, wherein the first lens unit includes one or more positive lenses, and
   wherein, when an average value of refractive indices at the d line of the one or more positive lenses is denoted by Nd1p, the following condition is satisfied:

$1.80 < Nd1p < 2.20$.

7. The zoom lens according to claim 1, wherein, when lateral magnifications of the second lens unit at the wide-angle end and the telephoto end are denoted respectively by β2w and β2t, the following condition is satisfied:

$2.8 < |β2t/β2w| < 5.5$.

8. The zoom lens according to claim 1, wherein, when a composite lateral magnification of the third lens unit and the fourth lens unit at the wide-angle end is denoted by β34w, and a composite lateral magnification of the third lens unit and the fourth lens unit at the telephoto end is denoted by β34t, the following condition is satisfied:

$0.70 < |β34t/β34w| < 1.20$.

9. The zoom lens according to claim 1, wherein, when a focal length of the entire zoom lens at the telephoto end is denoted by ft, and a movement amount of the third lens unit during zooming from the wide-angle end to the telephoto end is denoted by M3, the following condition is satisfied:

$0.40 < |M3|/\sqrt{(fw \cdot ft)} < 1.00$.

10. The zoom lens according to claim 1, wherein, when a movement amount of the fourth lens unit during zooming from the wide-angle end to the telephoto end is denoted by M4, the following condition is satisfied:

$0.35 < |M4|/\sqrt{(fw \cdot ft)} < 1.10$.

11. An image pickup apparatus comprising:
    a zoom lens; and
    an image sensor configured to receive an image formed by the zoom lens,
    wherein the zoom lens comprises, in order from an object side to an image side:
    a first lens unit having negative refractive power;
    a second lens unit having positive refractive power;
    a third lens unit having negative refractive power; and
    a fourth lens unit having positive refractive power,
    wherein each lens unit moves during zooming from a wide-angle end to a telephoto end, and
    wherein, when a focal length of the first lens unit is denoted by f1, a focal length of the second lens unit is denoted by f2, and a focal length of the entire zoom lens at the wide-angle end is denoted by fw, the following conditions are satisfied:

$-1.05 < f1/f2 < -0.55$ $-6.0 < f1/fw < -3.5$.

* * * * *